US012662629B2

(12) United States Patent
Zhou et al.

(10) Patent No.: US 12,662,629 B2
(45) Date of Patent: Jun. 23, 2026

(54) LIQUID CRYSTAL COMPOSITIONS AND DISPLAY PANELS USING THE SAME

(71) Applicant: TCL China Star Optoelectronics Technology Co., Ltd., Shenzhen (CN)

(72) Inventors: Hao Zhou, ShenZhen (CN); Xiao Liu, ShenZhen (CN)

(73) Assignee: TCL China Star Optoelectronics Technology Co., Ltd., Shenzhen (CN)

( * ) Notice: Subject to any disclaimer, the term of this patent is extended or adjusted under 35 U.S.C. 154(b) by 76 days.

(21) Appl. No.: 18/399,785

(22) Filed: Dec. 29, 2023

(65) Prior Publication Data

US 2025/0188351 A1 Jun. 12, 2025

(30) Foreign Application Priority Data

Dec. 8, 2023 (CN) ........................ 202311690692.2

(51) Int. Cl.
*C09K 19/30* (2006.01)
*C09K 19/12* (2006.01)
(Continued)

(52) U.S. Cl.
CPC .......... *C09K 19/3003* (2013.01); *C09K 19/12* (2013.01); *C09K 19/14* (2013.01);
(Continued)

(58) Field of Classification Search
CPC ...................................................... C09K 19/12
See application file for complete search history.

(56) References Cited

U.S. PATENT DOCUMENTS 11,466,214 B2 10/2022 Huang et al.

FOREIGN PATENT DOCUMENTS

CN 110499162 11/2019
CN 115710514 2/2023
(Continued)

OTHER PUBLICATIONS

Prüfungsantrag [Application of Examination] Dated Nov. 12, 2024 From the Deutsches Patent- und Markenamt [German Patent and Trademark Office] Re. Application No. 102024203547.5 and Its Translation Into English. (9 Pages).

(Continued)

*Primary Examiner* — Chanceity N Robinson

(57) ABSTRACT

A liquid crystal composition and a display panel using the same are provided. The liquid crystal composition includes a first compound represented by formula (I), a second compound represented by formula (II), a third compound represented by formula (III), and a fourth compound represented by formula (IV). $R_1$ to $R_8$ are independently selected from —H, —F, —Cl, —Br, —I, —CN, —SCN, —NCS, or —SF; or, $R_1$ to $R_8$ are independently selected from a substituted or unsubstituted alkyl group having 1-15 carbon atoms, a substituted or unsubstituted alkoxy group having 1-15 carbon atoms, a substituted or unsubstituted alkenyl group having 2-15 carbon atoms, a substituted or unsubstituted alkenyloxy group having 2-15 carbon atoms, a substituted or unsubstituted alkynyl group having 2-15 carbon atoms, or a substituted or unsubstituted alkynyloxy group having 2-15 carbon atoms, and substituent groups thereof are independently selected from F, Cl, Br, or I.

(I)

(Continued)

-continued (II)

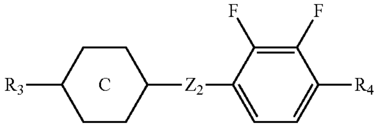

(III)

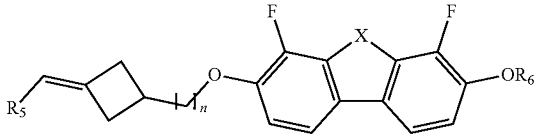

(IV)

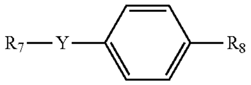

20 Claims, 1 Drawing Sheet

(51) Int. Cl.

| | |
|---|---|
| ***C09K 19/14*** | (2006.01) |
| ***C09K 19/34*** | (2006.01) |
| ***G02F 1/135*** | (2006.01) |

(52) U.S. Cl.

CPC ...... *C09K 19/3066* (2013.01); *C09K 19/3402* (2013.01); *C09K 19/3405* (2013.01); *C09K 19/3491* (2013.01); *G02F 1/135* (2013.01); *C09K 2019/3004* (2013.01); *C09K 2019/301* (2013.01); *C09K 2019/3016* (2013.01); *C09K 2019/3408* (2013.01)

(56) References Cited

FOREIGN PATENT DOCUMENTS

| | | | | | |
|---|---|---|---|---|---|
| CN | 115710515 | | 2/2023 | | |
| CN | 115872958 | | 3/2023 | | |
| CN | 115872958 A | * | 3/2023 | ............. | C07C 25/24 |
| CN | 115895679 A | * | 4/2023 | | |
| CN | 116162464 | | 5/2023 | | |

OTHER PUBLICATIONS

Notification of Office Action and Search Report Dated Jun. 24, 2025 From the State Intellectual Property Office of the People's Republic of China Re. Application No. 202311690692.2 and Its Translation Into English. (16 Pages).

* cited by examiner

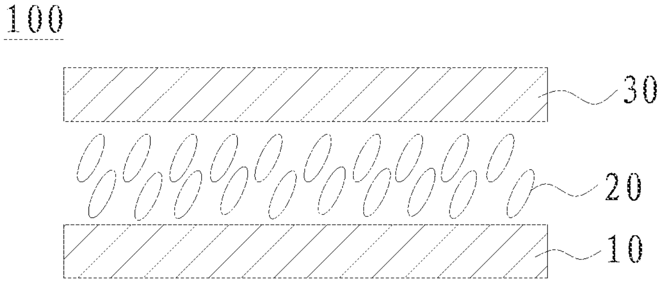
100
30
20
10

LIQUID CRYSTAL COMPOSITIONS AND DISPLAY PANELS USING THE SAME

CROSS-REFERENCE TO RELATED APPLICATION

This application claims the benefit of priority of Chinese Patent Application No. 202311690692.2, filed on Dec. 8, 2023, the contents of which are incorporated by reference as if fully set forth herein in their entirety.

TECHNICAL FIELD

The present disclosure relates to the field of display, and in particular, to liquid crystal compositions and display panels using the same.

BACKGROUND

Liquid crystal materials are widely used in various display devices, including, but not limited to, mobile phones, televisions, and computers. Liquid crystal materials play the role of "light valve" in thin film transistor liquid crystal displays (TFT-LCDs), which realizes the brightness adjustment of TFT-LCDs by controlling transmission of backlight. In order to make TFT-LCD present better display effect and have lower power consumption, performances of liquid crystal materials used in TFT-LCDs, such as the response time, the driving voltage, and the penetration rate, need to be improved.

SUMMARY

Embodiments of the present disclosure provide a liquid crystal composition including:

a first compound represented by formula (I);

(I)

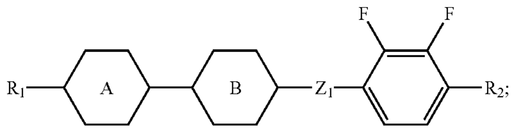

a second compound represented by formula (II);

(II)

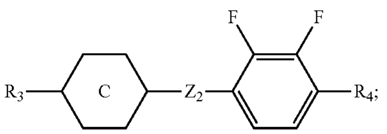

a third compound represented by formula (III);

(III)

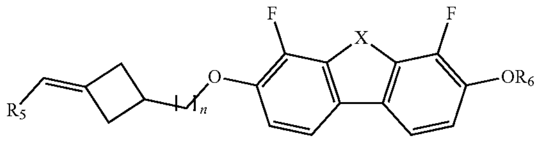

and a fourth compound represented by formula (IV);

(IV)

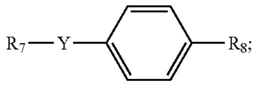

in which

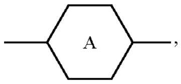,

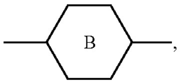, and

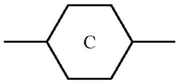

are independently selected from a group consisting of following substituted or unsubstituted groups:

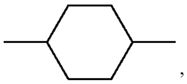, 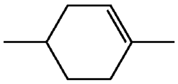,

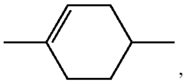, 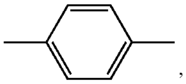,

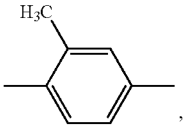, 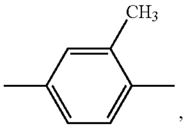,

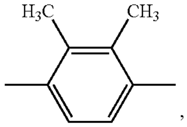, 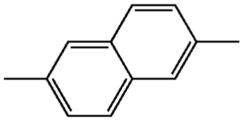,

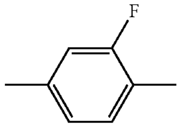, 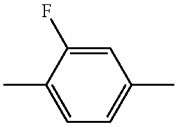,

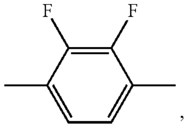, 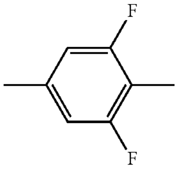,

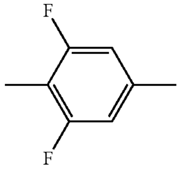, 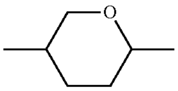,

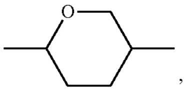, 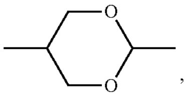,

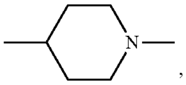, 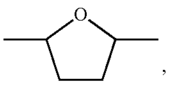, 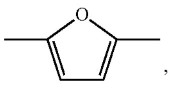,

-continued

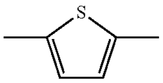 , 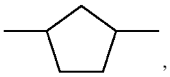 , 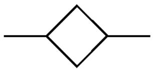 ,

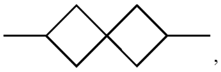 , and  , and substituent groups thereof are independently selected from a group consisting of F, Cl, Br, and I;

$Z_1$ and $Z_2$ are independently selected from a group consisting of a single bond, —O—, —S—, —$SO_2$—, —CO—, —C(O)O—, —OC(O)—, —OC(O)O—, and —C≡C—; or $Z_1$ and $Z_2$ are independently selected from a group consisting of following substituted or unsubstituted groups: —$CH_2O$—, —$OCH_2$—, —$CH_2$—$CH_2$—, —$(CH_2)_3$—, and —CH═CH—, and substituent groups thereof are independently selected from a group consisting of F, Cl, Br, and I;

X is selected from O or S;

n is selected from 0, 1, or 2;

Y is selected from

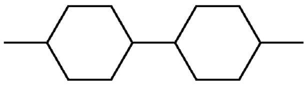 ,

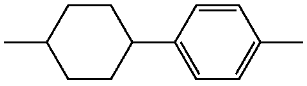 , or

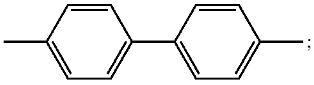 ;

and $R_1$ to $R_8$ are independently selected from a group consisting of —H, —F, —Cl, —Br, —I, —CN, —SCN, —NCS, and —SF; or, $R_1$ to $R_8$ are independently selected from a group consisting of a substituted or unsubstituted alkyl group having 1-15 carbon atoms, a substituted or unsubstituted alkoxy group having 1-15 carbon atoms, a substituted or unsubstituted alkenyl group having 2-15 carbon atoms, a substituted or unsubstituted alkenyloxy group having 2-15 carbon atoms, a substituted or unsubstituted alkynyl group having 2-15 carbon atoms, and a substituted or unsubstituted alkynyloxy group having 2-15 carbon atoms, and substituent groups thereof are independently selected from a group consisting of F, Cl, Br, and I.

Embodiments of the present disclosure further provide a display panel that includes a first substrate, a second substrate disposed facing the first substrate, and a liquid crystal layer disposed between the first substrate and the second substrate; and a material of the liquid crystal layer includes the liquid crystal composition as described above.

BRIEF DESCRIPTION OF THE DRAWINGS

In order to explain technical solutions in the embodiments of the present disclosure more clearly, the following contents will briefly introduce the drawings needed to be used in the description of the embodiments. Apparently, the drawings in the following description are only some embodiments of the present disclosure. For ordinary skilled in the art, other drawings can be obtained from these drawings without creative effort.

FIG. 1 is a schematic structural diagram of a display panel provided by some embodiments of the present disclosure.

DETAILED DESCRIPTION

In combination with drawings in the embodiments of the present disclosure, technical solutions in the embodiments of the present disclosure will be described clearly and completely in the following. Apparently, the described embodiments are only part of the embodiments of the present disclosure, not all of them. Based on the embodiments of the present disclosure, all other embodiments obtained by those skilled in the art without creative effort belong to the scope of the present disclosure.

In the present disclosure, terms "optional" and "optionally" means unrestricted, that is, either of two technical solutions of "have" and "none". If there are multiple "optional" or "optionally" in a technical solution, indicating that each "optional" or "optionally" is independent, unless otherwise specified and there are no contradictions or mutual constraints. In the present disclosure, the technical features described in an open form include a closed technical solution composed of the listed features, as well as an open technical solution containing the listed features.

The present disclosure provides a liquid crystal composition and a display panel. To make the purpose, the technical solutions, and effectiveness of the present disclosure clear and definite, the following contents will provide a further detailed description of the present disclosure. It can be understood that the embodiments described here are only to illustrate the present disclosure and not intended to limit the present disclosure.

In the present disclosure, "substituted" indicates that hydrogen atom (H) in a substituted group is a group substituted by a substituent group, unless otherwise specified.

In the present disclosure, "substituted or unsubstituted" indicates that a defined group may be substituted or not be substituted. When the defined group is substituted, it can be understood that the defined group may be substituted by at least one substituent group. In the present disclosure, "substituted" indicates that H is substituted by any one selected from a group consisting of substituent groups, such as F, Cl, Br, and I, unless otherwise specified.

Some embodiments of the present disclosure provide a liquid crystal composition including at least one first compound, at least one second compound, at least one third compound, and at least one fourth compound.

The first compound is represented by the following formula (I);

(I)

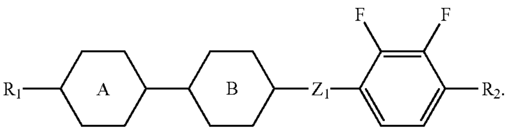

In the formula (I),

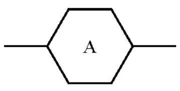 and 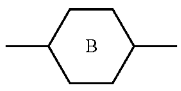

and are independently selected from a group consisting of following substituted or unsubstituted groups:

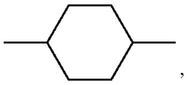 , 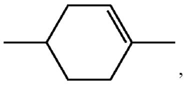 ,

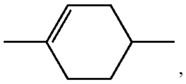 , 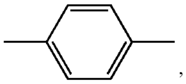 ,

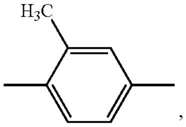 , 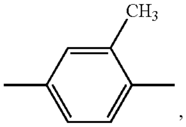 ,

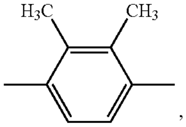 , 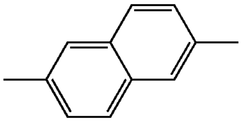 ,

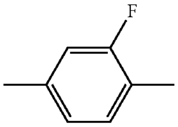 , 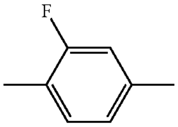 ,

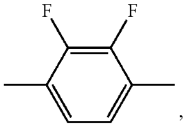 , 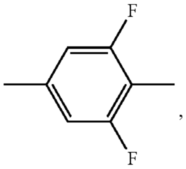 ,

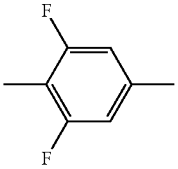 , 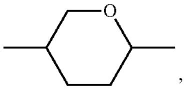 ,

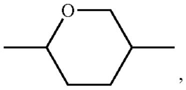 , 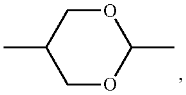 ,

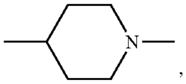 , 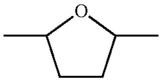 , 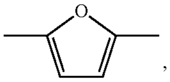 ,

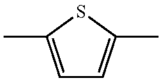 , 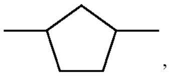 , 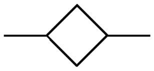 ,

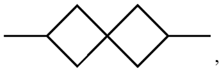 , and  ;

and substituent groups of the above groups are independently selected from a group consisting of F, Cl, Br, and I, if present.

In the formula (I), $Z_1$ is selected from a group consisting of a single bond, —O—, —S—, —$SO_2$—, —CO—, —C(O)O—, —OC(O)—, —OC(O)O—, and —C≡C—; or, $Z_1$ is selected from a group consisting of following substituted or unsubstituted groups: —$CH_2O$—, —$OCH_2$—, —$CH_2$—$CH_2$—, —$(CH_2)_3$—, and —CH═CH—, and substituent groups of the above groups are independently selected from a group consisting of F, Cl, Br, and I, if present.

In the formula (I), $R_1$ and $R_2$ are independently selected from a group consisting of —H, —F, —Cl, —Br, —I, —CN, —SCN, —NCS, and —SF; or, $R_1$ and $R_2$ are independently selected from a group consisting of a substituted or unsubstituted alkyl group having 1-15 carbon atoms, a substituted or unsubstituted alkoxy group having 1-15 carbon atoms, a substituted or unsubstituted alkenyl group having 2-15 carbon atoms, a substituted or unsubstituted alkenyloxy group having 2-15 carbon atoms, a substituted or unsubstituted alkynyl group having 2-15 carbon atoms, and a substituted or unsubstituted alkynyloxy group having 2-15 carbon atoms, and substituent groups of the above groups are independently selected from a group consisting of F, Cl, Br, and I, if present.

The second compound is represented by the following formula (II):

(II)

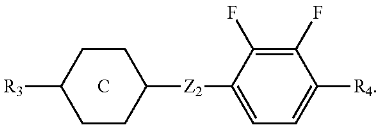

In the formula (II),

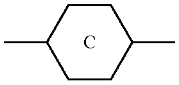

is selected from a group consisting of following substituted or unsubstituted groups:

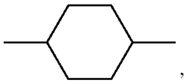 , 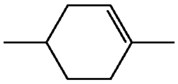 ,

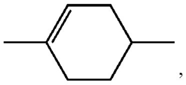 , 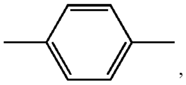 ,

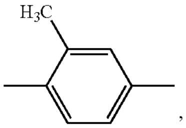 , 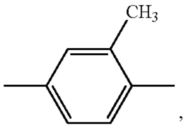 ,

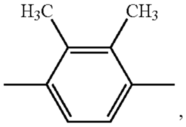 , 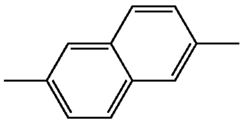 ,

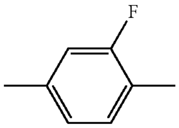 , 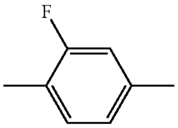 ,

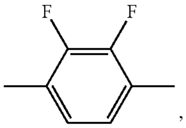 , 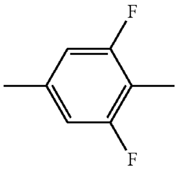 ,

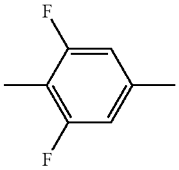 , 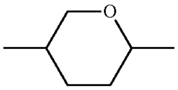 ,

-continued

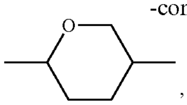, 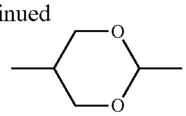,

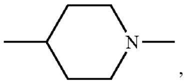, 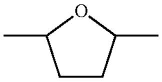, 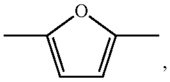,

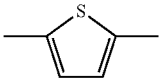, 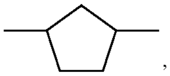, 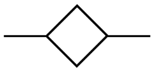,

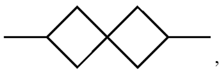, and ;

substituent groups of the above groups are independently selected from a group consisting of F, Cl, Br, and I, if present.

In the formula (II), $Z_2$ is selected from a group consisting of a single bond, —O—, —S—, —$SO_2$—, —CO—, —C(O)O—, —OC(O)—, —OC(O)O—, and —C≡C—; or, $Z_2$ is selected from a group consisting of following substituted or unsubstituted groups: —$CH_2O$—, —$OCH_2$—, —$CH_2$—$CH_2$—, —$(CH_2)_3$—, and —CH═CH—, and substituent groups of the above groups are independently selected from a group consisting of F, Cl, Br, and I, if present.

In the formula (II), $R_3$ and $R_4$ are independently selected from a group consisting of —H, —F, —Cl, —Br, —I, —CN, —SCN, —NCS, and —SF; or, $R_1$ to $R_8$ are independently selected from a group consisting of a substituted or unsubstituted alkyl group having 1-15 carbon atoms, a substituted or unsubstituted alkoxy group having 1-15 carbon atoms, a substituted or unsubstituted alkenyl group having 2-15 carbon atoms, a substituted or unsubstituted alkenyloxy group having 2-15 carbon atoms, a substituted or unsubstituted alkynyl group having 2-15 carbon atoms, and a substituted or unsubstituted alkynyloxy group having 2-15 carbon atoms, and substituent groups of the above groups are independently selected from a group consisting of F, Cl, Br, and I, if present.

The third compound is represented by the following formula (III):

(III)

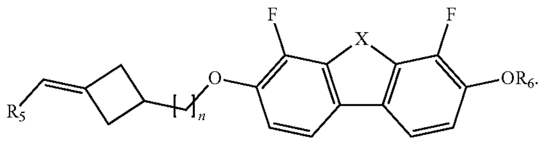

In the formula (III), X is selected from O or S, and n is selected from 0, 1, or 2.

In the formula (III), $R_5$ and $R_6$ are independently selected from a group consisting of —H, —F, —Cl, —Br, —I, —CN, —SCN, —NCS, and —SF; or, $R_5$ and $R_6$ are independently selected from a group consisting of a substituted or unsubstituted alkyl group having 1-15 carbon atoms, a substituted or unsubstituted alkoxy group having 1-15 carbon atoms, a substituted or unsubstituted alkenyl group having 2-15 carbon atoms, a substituted or unsubstituted alkenyloxy group having 2-15 carbon atoms, a substituted or unsubstituted alkynyl group having 2-15 carbon atoms, and a substituted or unsubstituted alkynyloxy group having 2-15 carbon atoms, and substituent groups of the above groups are independently selected from a group consisting of F, Cl, Br, and I, if present.

The fourth compound is represented by the following formula (IV):

(IV)

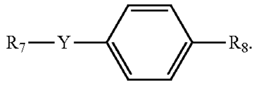

In the formula (IV), Y is selected from

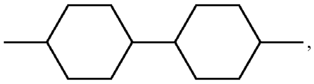,

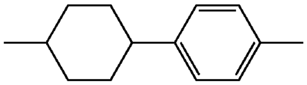, or

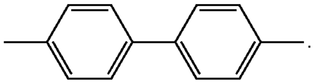.

In the formula (IV), $R_7$ and $R_8$ are independently selected from a group consisting of —H, —F, —Cl, —Br, —I, —CN, —SCN, —NCS, and —SF; or, $R_7$ and $R_8$ are independently selected from a group consisting of a substituted or unsubstituted alkyl group having 1-15 carbon atoms, a substituted or unsubstituted alkoxy group having 1-15 carbon atoms, a substituted or unsubstituted alkenyl group having 2-15 carbon atoms, a substituted or unsubstituted alkenyloxy group having 2-15 carbon atoms, a substituted or unsubstituted alkynyl group having 2-15 carbon atoms, and a substituted or unsubstituted alkynyloxy group having 2-15 carbon atoms, and substituent groups of the above groups are independently selected from a group consisting of F, Cl, Br, and I, if present.

The liquid crystal composition provided by the embodiments of the present disclosure can adjust the birefringence difference of the liquid crystal composition through the combination of the first compound, the second compound, the third compound, and the fourth compound, so as to realize the control of the optical anisotropy of the liquid crystal composition, thereby improving the penetration rate of the display device using the liquid crystal composition. In addition, the above combination enables the liquid crystal composition to have a high clearing point, a high dielectric coefficient, high optical anisotropy, a high elastic coefficient, and low viscosity, which can improve the response speed and penetration rate of display devices using the liquid crystal composition as liquid crystal materials while reducing the driving voltage for display devices.

In some embodiments, one or more end groups of $R_1$ to $R_8$ are independently selected from a group consisting of —H, —CN, and —$CF_3$.

In some embodiments, one or more —$CH_2$— groups in at least one of $R_1$ to $R_8$ are independently replaced by any one selected from a group consisting of —O—, —S—, —$SO_2$—, —CO—, —C(O)O—, —OC(O)—, —OC(O)O—, and —C≡C—. In some embodiments, one or more —$CH_2$— groups in at least one of $R_1$ to $R_8$ are independently replaced by any one selected from a group consisting of following substituted or unsubstituted groups: —$CH_2O$—, —$OCH_2$—, —$CH_2$—$CH_2$—, —$(CH_2)_3$—, and —CH═CH—, and substituent groups of the above groups are independently selected from a group consisting of F, Cl, Br, and I, if present.

In some embodiments, one or more end groups of $R_1$ to $R_8$ are independently selected from a group consisting of —H, —CN, and —$CF_3$, and one or more —$CH_2$— groups in at least one of $R_1$ to $R_8$ are independently replaced by any one selected from a group consisting of —O—, —S—, —$SO_2$—, —CO—, —C(O)O—, —OC(O)—, —OC(O)O—, and —C≡C—.

In some embodiments, one or more end groups of $R_1$ to $R_8$ are independently selected from a group consisting of —H, —CN, or —$CF_3$, and one or more —$CH_2$— groups in at least one of $R_1$ to $R_8$ are independently replaced by any one selected from a group consisting of following substituted or unsubstituted groups: —$CH_2O$—, —$OCH_2$—, —$CH_2$—$CH_2$—, —$(CH_2)_3$—, and —CH═CH—, and substituent groups of the above groups are independently selected from a group consisting of F, Cl, Br, and I, if present.

In some embodiments, one or more end groups of $R_1$ to $R_8$ are independently selected from a group consisting of —H, —CN, and —$CF_3$, indicating that one or more end groups of $R_1$ to $R_8$ are independently mono-substituted by —H, —CN, or —$CF_3$.

In some embodiments, when hydrogen atoms in one or more —$CH_2$— groups in at least one of $R_1$ to $R_8$ are independently replaced by halogen atoms such as F, Cl, Br, or I, adjacent heteroatoms are not directly linked, in which heteroatoms indicate F, Cl, Br, or I.

In some embodiments, one or more —$CH_2$— groups in at least one of $R_1$ to $R_8$ are independently replaced by any one selected from a group consisting of following substituted or unsubstituted groups: —$CH_2O$—, —$OCH_2$—, —$CH_2$—$CH_2$—, —$(CH_2)_3$—, and —CH═CH—, and substituent groups of the above groups are F, if present.

In some embodiments, in the first compound represented by the formula (I),

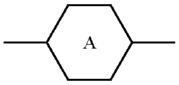 and 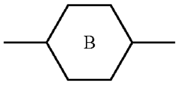

and are independently selected from a group consisting of following substituted or unsubstituted groups:

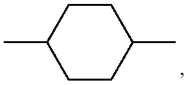, 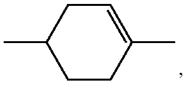,
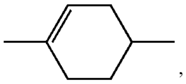, 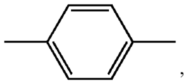,
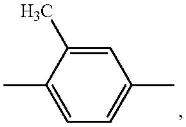, 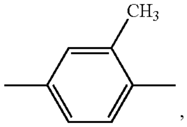,
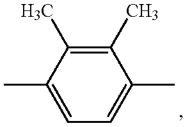, 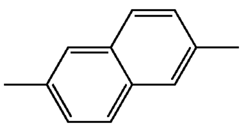,
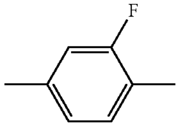, 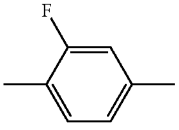, -continued

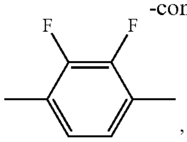, 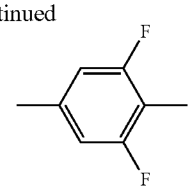,
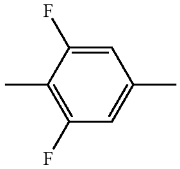, 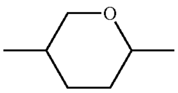,
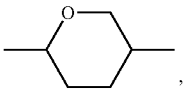, 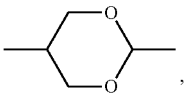,
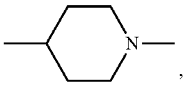, 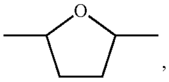, 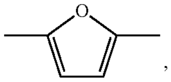,
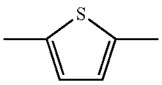, 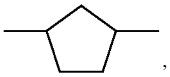, 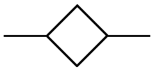,
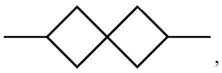, and ;

and substituent groups of the above groups are F, if present.

In some embodiments,

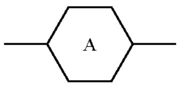 and 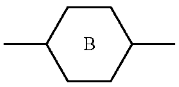

are independently selected from a group consisting of following groups:

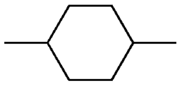, 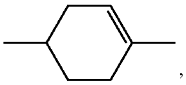,
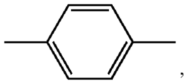, 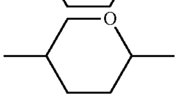,
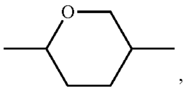, 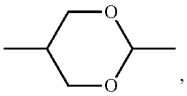,
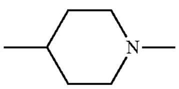, 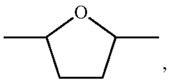,
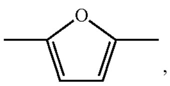, and 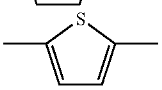.

In some embodiments,

 and 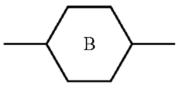

are independently selected from

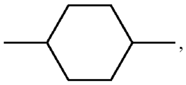, 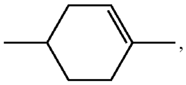, or

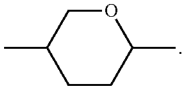.

In some embodiments, in the first compound represented by the formula (I), $Z_1$ is selected from a group consisting of a single bond, —O—, —S—, —$SO_2$—, —CO—, —C(O)O—, —OC(O)—, —OC(O)O—, —$CH_2O$—, —$OCH_2$—, —$CF_2O$—, —$OCF_2$—, —$CF_2$—$CF_2$—, —$CF_2$—$CH_2$—, —$CH_2$—$CF_2$—, —CHF—CHF—, —CH═CH—, —CF═CH—, —CH═CF—, —CF═CF—, and —C≡C—. In some embodiments, $Z_1$ is selected from a group consisting of a single bond, —$CH_2O$—, —$OCH_2$—, —$CF_2O$—, —$OCF_2$—, —$CF_2$—$CF_2$—, —$CF_2$—$CH_2$—, —$CH_2$—$CF_2$—, and —CHF—CHF—. In some embodiments, $Z_1$ is selected from a single bond, —$CH_2O$—, or —$OCH_2$—.

In some embodiments, in the first compound represented by the formula (I), $R_1$ and $R_2$ are independently selected from a group consisting of a substituted or unsubstituted alkyl group having 1-15 carbon atoms, a substituted or unsubstituted alkoxy group having 1-15 carbon atoms, a substituted or unsubstituted alkenyl group having 2-15 carbon atoms, a substituted or unsubstituted alkenyloxy group having 2-15 carbon atoms, a substituted or unsubstituted alkynyl group having 2-15 carbon atoms, and a substituted or unsubstituted alkynyloxy group having 2-15 carbon atoms, and substituent groups of the above groups are F, if present. Further, in some embodiments, $R_1$ and $R_2$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms. Furthermore, in some embodiments, $R_1$ and $R_2$ are independently selected from a group consisting of a substituted or unsubstituted alkyl group having 1-5 carbon atoms, a substituted or unsubstituted alkoxy group having 1-5 carbon atoms, a substituted or unsubstituted alkenyl group having 2-5 carbon atoms, a substituted or unsubstituted alkenyloxy group having 2-5 carbon atoms, a substituted or unsubstituted alkynyl group having 2-5 carbon atoms, and a substituted or unsubstituted alkynyloxy group having 2-5 carbon atoms.

In some embodiments, $R_1$ and $R_2$ are independently selected from a group consisting of methyl, ethyl, propyl, butyl, pentyl, vinyl, prop-1-enyl, prop-2-enyl, but-1-enyl, but-2-enyl, but-3-enyl, pent-1-enyl, pent-2-enyl, pent-3-enyl, pent-4-enyl, acetylenyl, prop-1-ynyl, prop-2-ynyl, but-1-ynyl, but-2-ynyl, but-3-ynyl, pent-1-ynyl, pent-2-ynyl, pent-3-ynyl, and pent-4-ynyl, 1. Further, in some embodiments, $R_1$ and $R_2$ are independently selected from methyl, ethyl, or propyl.

In some embodiments, the first compound is represented by any one selected from a group consisting of formula (I-1) to formula (I-48):

I-1

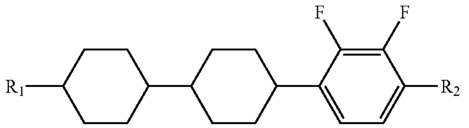

I-2

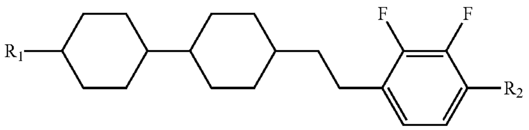

I-3

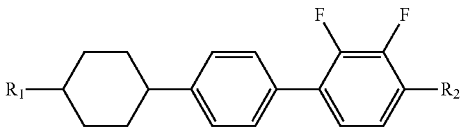

I-4

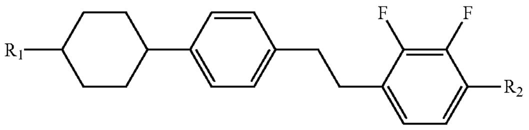

I-5

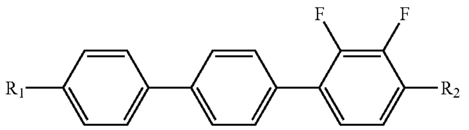

I-6

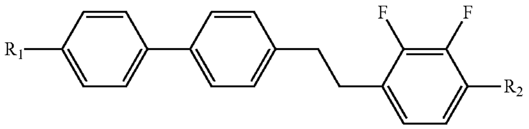

I-7

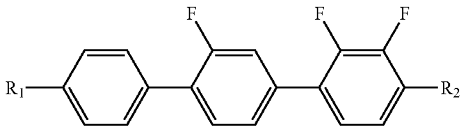

I-8

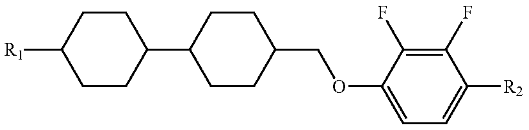

I-9

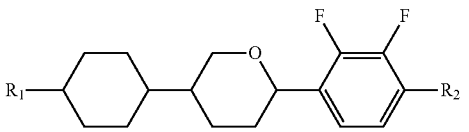

I-10

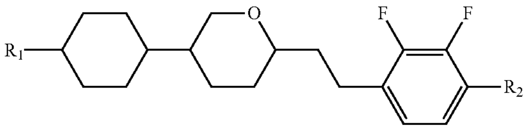

-continued
I-11
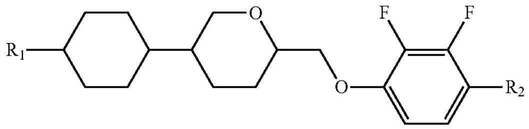
I-12
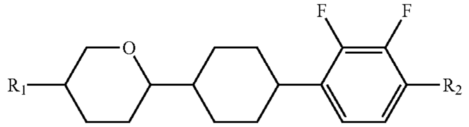
I-13
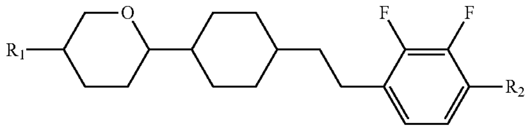
I-14
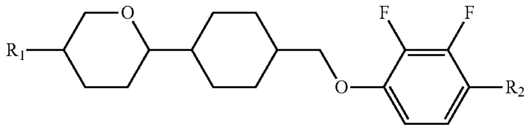
I-15
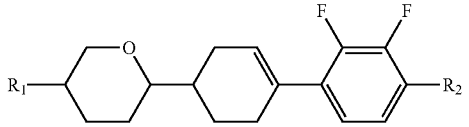
I-16
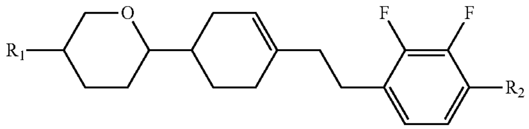
I-17
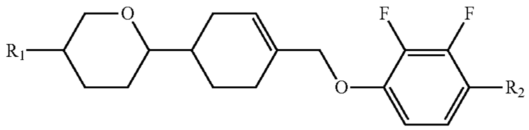
I-18
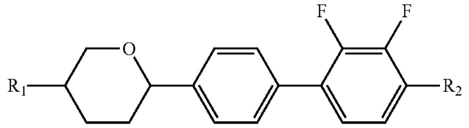
I-19
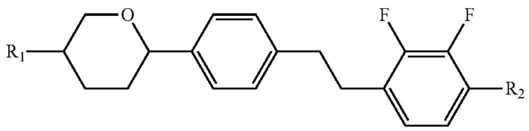
I-20
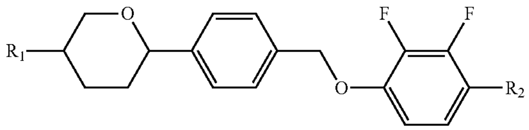
-continued
I-21
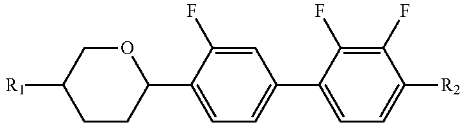
I-22
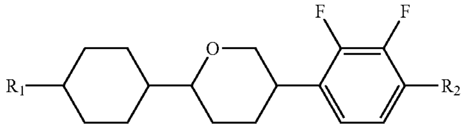
I-23
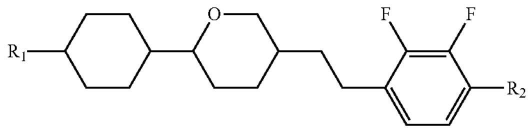
I-24
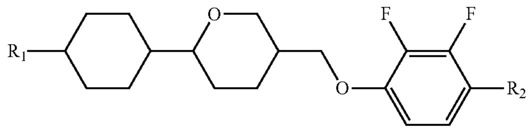
I-25
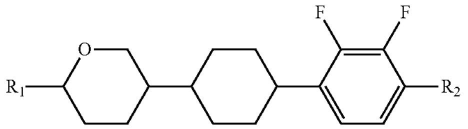
I-26
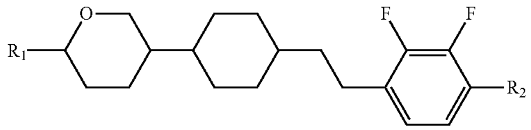
I-27
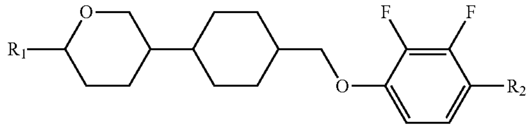
I-28
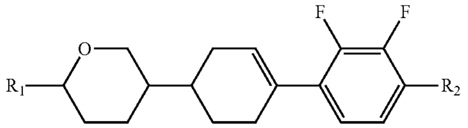
I-29
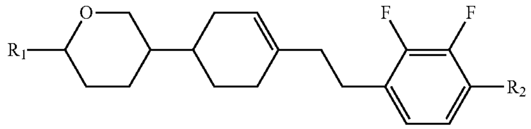
I-30
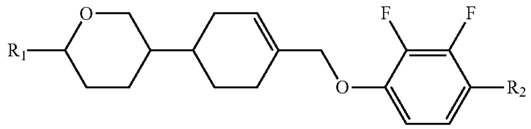

-continued
I-31
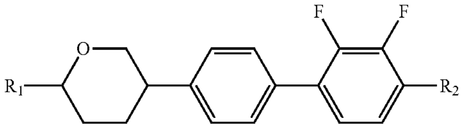
I-32
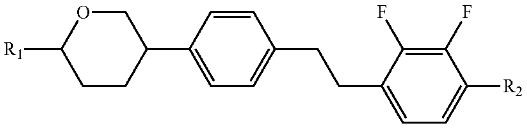
I-33
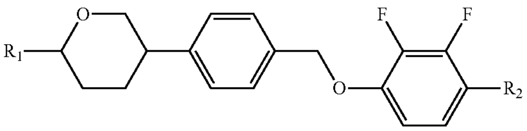
I-34
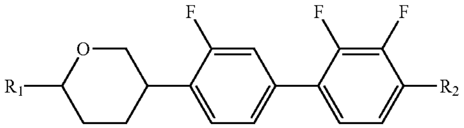
I-35
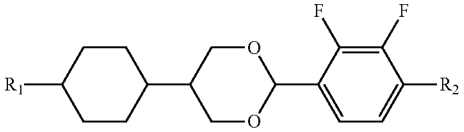
I-36
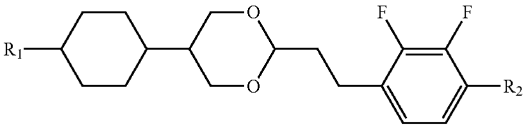
I-37
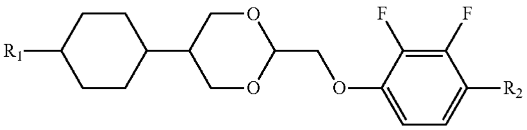
I-38
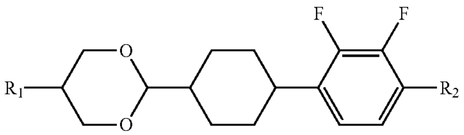
I-39
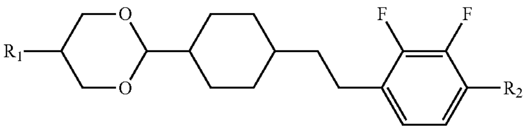
I-40
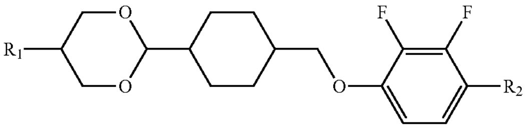
-continued
I-41
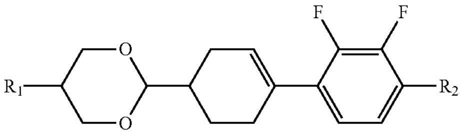
I-42
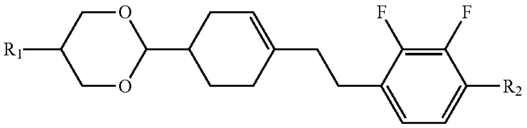
I-43
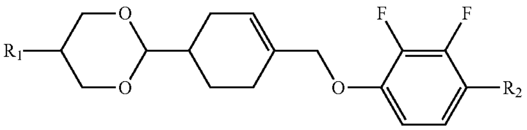
I-44
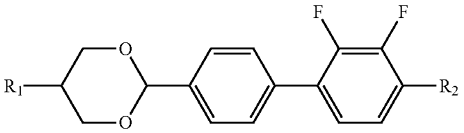
I-45
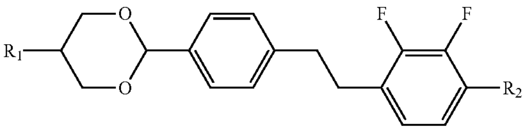
I-46
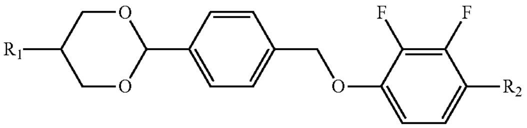
I-47
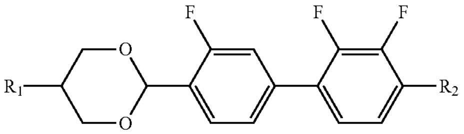
I-48
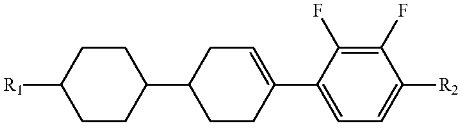
In some embodiments, in the second compound represented by the formula (II),
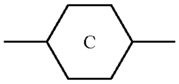
is selected from a group consisting of following substituted or unsubstituted groups:
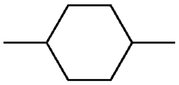,
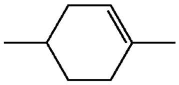, -continued

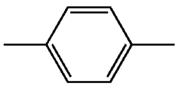, 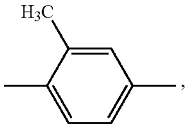,
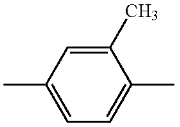, 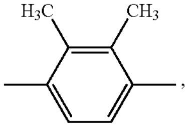,
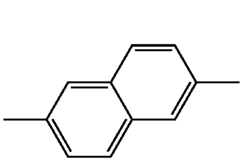, 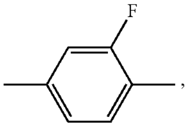,
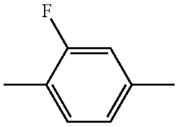, 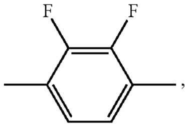,
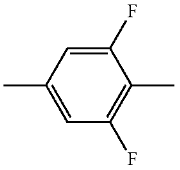, 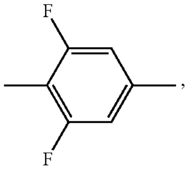,
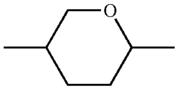, 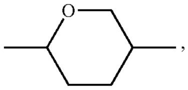,
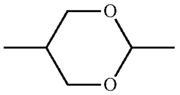, 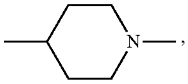,
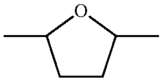, 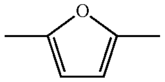,
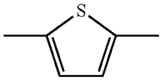, 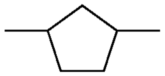,
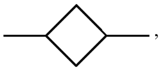, 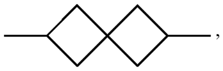, and
;

and substituent groups of the above groups are F, if present.

Further, in some embodiments,

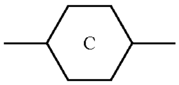

is selected from a group consisting of following groups:

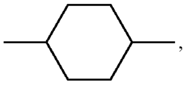, 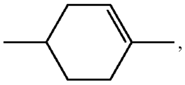,
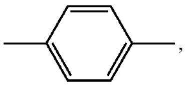, 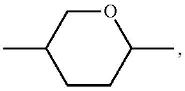,

-continued

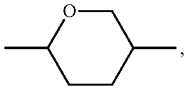, 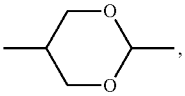,
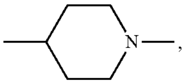, 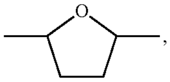, and
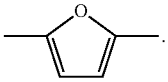.

Furthermore, in some embodiments,

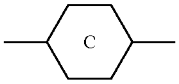

is selected from

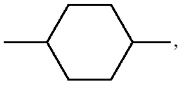, or
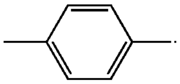.

In some embodiments, in the second compound represented by the formula (II), $Z_2$ is selected from a group consisting of a single bond, —O—, —S—, —$SO_2$—, —CO—, —C(O)O—, —OC(O)—, —OC(O)O—, —$CH_2O$—, —$OCH_2$—, —$CF_2O$—, —$OCF_2$—, —$CF_2$—$CF_2$—, —$CF_2$—$CH_2$—, —$CH_2$—$CF_2$—, —CHF—CHF—, —CH═CH—, —CF═CH—, —CH═CF—, —CF═CF—, and —C≡C—. Further, in some embodiments, $Z_2$ is selected from a group consisting of a single bond, —$CH_2O$—, —$OCH_2$—, —$CF_2O$—, —$OCF_2$—, —$CF_2$—$CF_2$—, —$CF_2$—$CH_2$—, —$CH_2$—$CF_2$—, and —CHF—CHF—. Furthermore, in some embodiments, $Z_2$ is selected from a single bond, —$CH_2O$—, or —$OCH_2$—.

In the present disclosure, $R_3$ and $R_4$ have the same ranges as $R_1$, and are independently selected from the same or different group as $R_1$, which will not be repeated here.

In some embodiments, the second compound is represented by any one selected from a group consisting of formula (II-1) to formula (II-15):

II-1

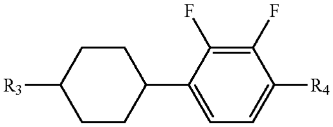

II-2

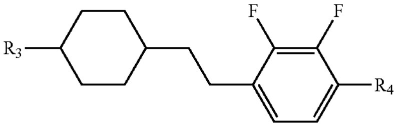

-continued

II-3

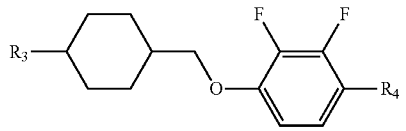

II-4

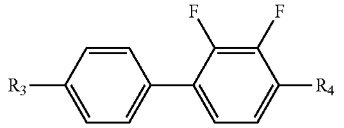

II-5

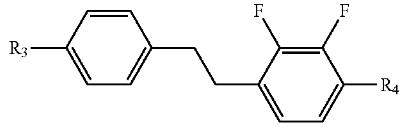

II-6

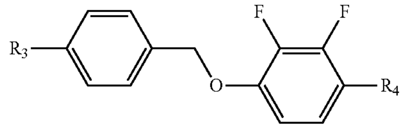

II-7

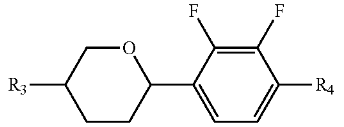

II-8

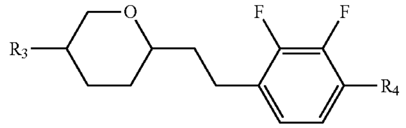

II-9

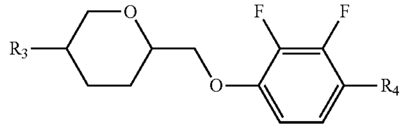

II-10

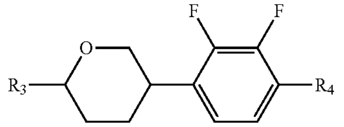

II-11

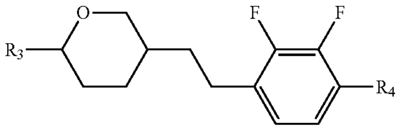

II-12

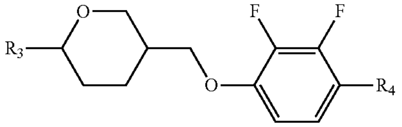

II-13

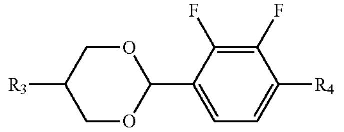

-continued

II-14

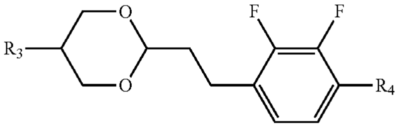

II-15

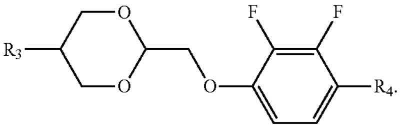

In some embodiments, in the third compound represented by formula (III), X is selected from O or S, and n is 1.

In the present disclosure, $R_5$ and $R_6$ have the same ranges as $R_1$, and are independently selected to be the same as or different group from $R_1$, which will not be repeated here.

In some embodiments, the third compound is represented by any one selected from a group consisting of formula (III-1) to formula (III-6).

III-1

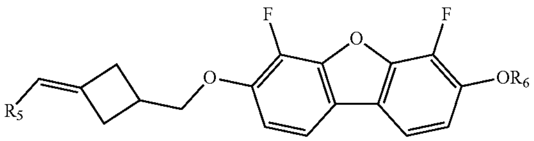

III-2

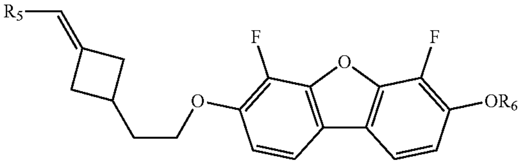

III-3

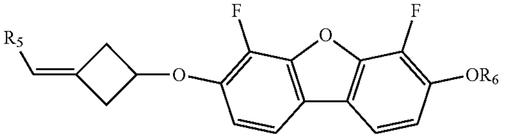

III-4

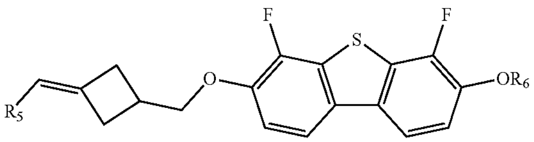

III-5

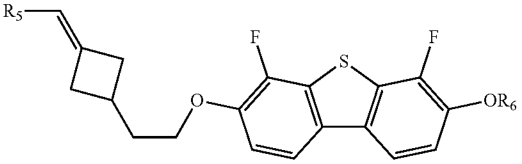

III-6

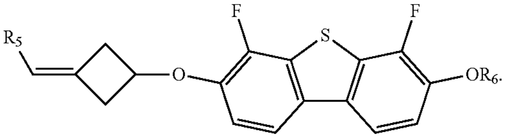

In some embodiments, the fourth compound is represented by any one selected from a group consisting of formula (IV-1), formula (IV-2), and formula (IV-3):

(IV-1)

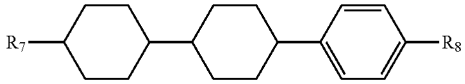

(IV-2)

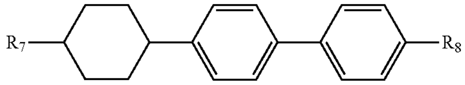

(IV-3)

In the present disclosure, $R_7$ and $R_8$ in the formula (IV-1), formula (IV-2), and formula (IV-3) have the same ranges as $R_1$, and are independently selected to be the same as or different group from $R_1$, which will not be repeated here.

In some embodiments, the fourth compound is represented by any one selected from a group consisting of formula (IV-1-1) to formula (IV-3-12):

IV-1-1

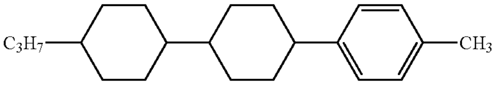

IV-1-2

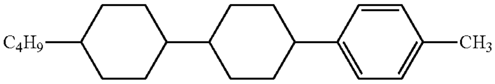

IV-1-3

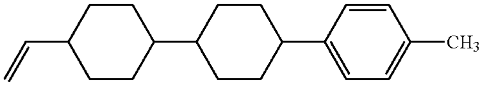

IV-1-4

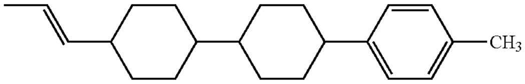

IV-1-5

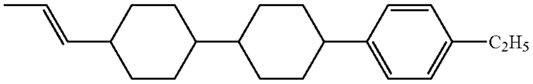

IV-1-6

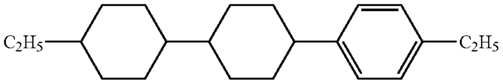

IV-1-7

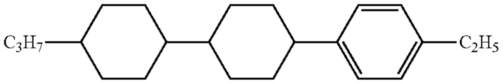

IV-1-8

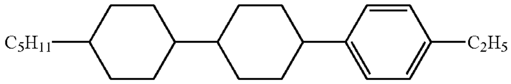

-continued

IV-1-9

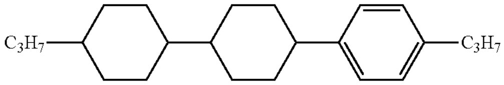

IV-1-10

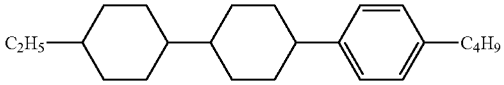

IV-1-11

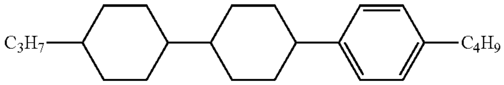

IV-1-12

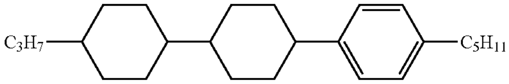

IV-2-1

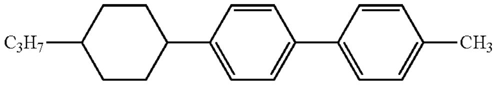

IV-2-2

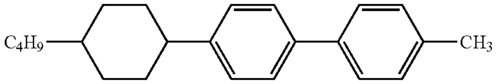

IV-2-3

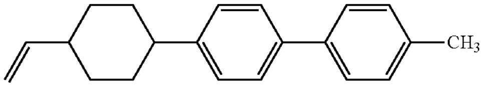

IV-2-4

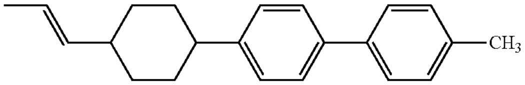

IV-2-5

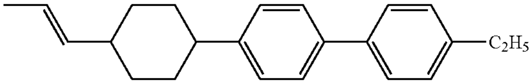

IV-2-6

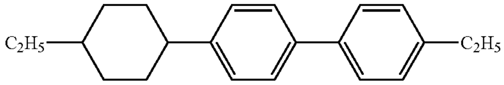

IV-2-7

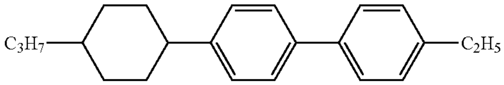

IV-2-8

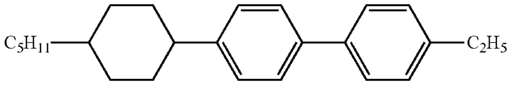

IV-2-9

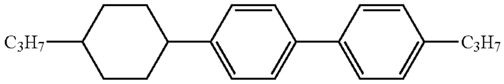

-continued

IV-2-10

IV-2-11

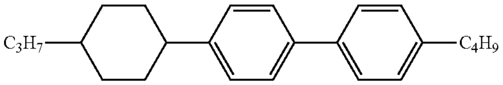

IV-2-12

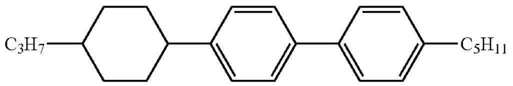

IV-3-1

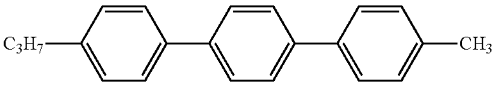

IV-3-2

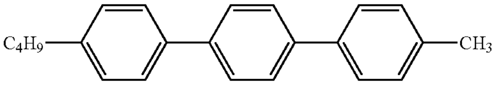

IV-3-3

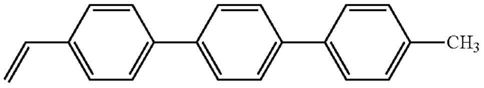

IV-3-4

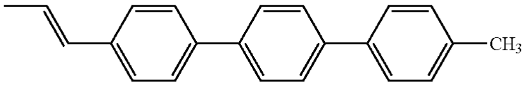

IV-3-5

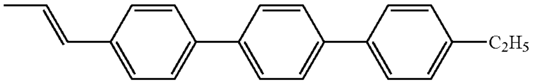

IV-3-6

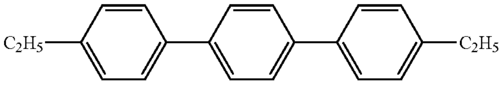

IV-3-7

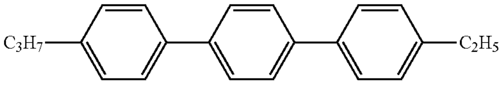

IV-3-8

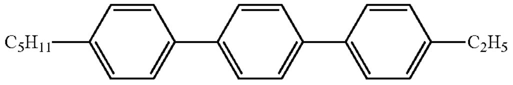

IV-3-9

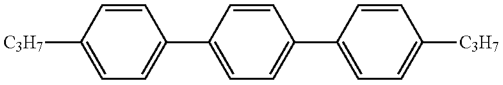

IV-3-10

-continued

IV-3-11

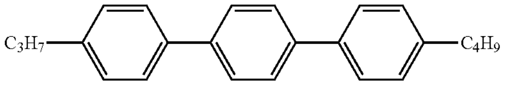

IV-3-12

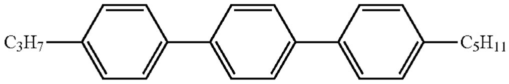

In some embodiments, the liquid crystal composition includes the first compound having a mass percentage ranging from 1% to 35%, the second compound having a mass percentage ranging from 1% to 40%, the third compound having a mass percentage ranging from 1% to 20%, and the fourth compound having a mass percentage ranging from 1% to 30%, based on a total mass of the liquid crystal composition. Within the ranges of mass percentages mentioned above, the above four compounds have good solubility at a low temperature, so as to improve the solubility of the liquid crystal composition.

In some embodiments, the liquid crystal composition includes the first compound having the mass percentage ranging from 1% to 25%, the second compound having the mass percentage ranging from 5% to 35%, the third compound having the mass percentage ranging from 1% to 18%, and the fourth compound having the mass percentage ranging from 1% to 25%. Further, in some embodiments, the liquid crystal composition includes the first compound having the mass percentage ranging from 5% to 22%, the second compound having the mass percentage ranging from 10% to 30%, the third compound having the mass percentage ranging from 1% to 15%, and the fourth compound having the mass percentage ranging from 5% to 25%.

In the present disclosure, the term "at least one" refers to one, two, or more than two. In some embodiments of the present disclosure, the liquid crystal composition may include one first compound, one second compound, one third compound, and one fourth compound. In some embodiments, the liquid crystal composition may include two or more first compounds, two or more second compounds, two or more third compounds, and/or two or more fourth compounds. For example, when the liquid crystal composition includes two or more first compounds, the two or more first compounds are selected to be different compounds represented by the formula (I); when the liquid crystal composition includes two or more second compounds, the two or more second compounds are selected to be different compounds represented by the formula (II); when the liquid crystal composition includes two or more third compounds, the two or more third compounds are selected to be different compounds represented by the formula (III); and when the liquid crystal composition includes two or more fourth compounds, the two or more fourth compounds are selected to be different compounds represented by the formula (IV).

In some embodiments, the liquid crystal composition further includes at least one fifth compound represented by the following formula (V):

(V)

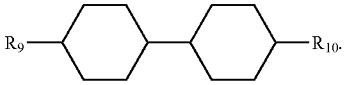

In the formula (V), $R_9$ and $R_{10}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups of the above groups are independently selected from a group consisting of F, Cl, Br, and I, if present.

The fifth compound represented by the formula (V) has a lower clearing point, a smaller birefringence difference, a lower elastic coefficient, and lower viscosity, which further adjusts the parameters of the liquid crystal composition, such as the clearing point, the optical anisotropy, the dielectric coefficient, and the elastic coefficient, and further reduces the viscosity of the liquid crystal composition, thereby improving the response speed of liquid crystals. In particular, in some embodiments, the fifth compound can be added to the liquid crystal composition as a viscosity diluent, so as to reduce the viscosity of the liquid crystal composition, which is beneficial to reducing the response time of liquid crystals to improve the response speed.

In some embodiments, $R_9$ and $R_{10}$ are independently selected from a group consisting of a substituted or unsubstituted alkyl group having 1-7 carbon atoms, a substituted or unsubstituted alkoxy group having 1-7 carbon atoms, a substituted or unsubstituted alkenyl group having 2-7 carbon atoms, a substituted or unsubstituted alkenyloxy group having 2-7 carbon atoms, a substituted or unsubstituted alkynyl group having 2-7 carbon atoms, and a substituted or unsubstituted alkynyloxy group having 2-7 carbon atoms, and substituent groups of the above groups are F, if present. Further, in some embodiments, $R_9$ and $R_{10}$ are independently selected from a group consisting of a substituted or unsubstituted alkyl group having 1-5 carbon atoms, a substituted or unsubstituted alkenyl group having 2-5 carbon atoms, and a substituted or unsubstituted alkynyl group having 2-5 carbon atoms, and substituent groups of the above groups are F, if present.

In some embodiments, $R_9$ and $R_{10}$ are independently selected from a group consisting of methyl, ethyl, propyl, butyl, pentyl, vinyl, prop-1-enyl, prop-2-enyl, but-1-enyl, but-2-enyl, but-3-enyl, pent-1-enyl, pent-2-enyl, pent-3-enyl, pent-4-enyl, acetylenyl, prop-1-ynyl, prop-2-ynyl, but-1-ynyl, but-2-ynyl, but-3-ynyl, pent-1-ynyl, pent-2-ynyl, pent-3-ynyl, and pent-4-ynyl, 1. Further, in some embodiments, $R_9$ and $R_{10}$ are independently selected from a group consisting of methyl, ethyl, propyl, vinyl, and acetylenyl.

In some embodiments, the fifth compound in the liquid crystal composition has a mass percentage ranging from 0% to 60%, based on the total mass of the liquid crystal composition. Within the range of the mass percentage mentioned above, the fifth compound has good solubility at a low temperature, so as to further improve the solubility of the liquid crystal composition. Furthermore, in some embodiments, the mass percentage of the fifth compound in the liquid crystal composition may be 5%, 10%, 15%, 20%, 15%, 30%, 35%, 40%, 45%, 50%, 55%, or 60%.

In some embodiments, the liquid crystal composition further includes at least one sixth compound represented by formula (VI):

(VI)

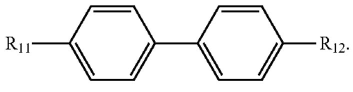

In the formula (VI), $R_{11}$ and $R_{12}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups of the above groups are independently selected from a group consisting of F, Cl, Br, and I, if present.

The sixth compound represented by the formula (VI) has a lower clearing point, a lower elastic coefficient, and lower viscosity, which further adjusts the clearing point, the optical anisotropy, the dielectric coefficient, and the elastic coefficient of the liquid crystal composition, and reduces the viscosity of the liquid crystal composition, thereby further improving the response speed of liquid crystals.

In the present disclosure, $R_{11}$ and $R_{12}$ have the same ranges as $R_1$, and are independently selected to be the same as or different group from $R_1$, which will not be repeated here.

In some embodiments, the sixth compound in the liquid crystal composition has a mass percentage ranging from 0% to 30%, based on the total mass of the liquid crystal composition. Within the range of the mass percentage mentioned above, the sixth compound has good solubility at a low temperature, so as to improve the solubility of the liquid crystal composition. Furthermore, in some embodiments, the mass percentage of the sixth compound in the liquid crystal composition may be 1%, 5%, 10%, 15%, 20%, 15%, or 30%.

In some embodiments, the liquid crystal composition further includes at least one seventh compound represented by formula (VII):

(VII)

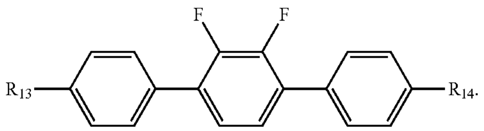

In the formula (VII), $R_{13}$ and $R_{14}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups of the above groups are independently selected from a group consisting of F, Cl, Br, and I, if present.

The seventh compound represented by the formula (VII) has a higher birefringence difference and a lower dielectric coefficient, and can further adjust the clearing point, the optical anisotropy, the dielectric coefficient, the elastic coefficient, and the viscosity of the liquid crystal composition, so as to meet different needs for performances of the liquid crystal composition.

In some embodiments, $R_{13}$ and $R_{14}$ have the same ranges as $R_1$, and are independently selected to be the same as or different group from $R_1$, which will not be repeated here.

In some embodiments, the seventh compound in the liquid crystal composition has a mass percentage ranging from 0% to 15%, based on the total mass of the liquid crystal composition. Within the range of the mass percentage mentioned above, the seventh compound has good solubility at a low temperature, so as to improve the solubility of the liquid crystal composition. Furthermore, in some embodiments, the mass percentage of the seventh compound in the liquid crystal composition may be 1%, 5%, 8%, 10%, 12%, or 15%.

In some embodiments, the liquid crystal composition further includes at least one eighth compound represented by formula (VIII):

(VIII)

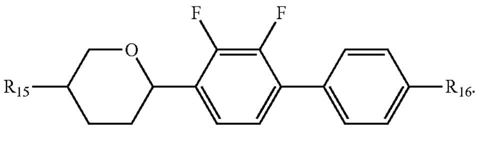

In the formula (VIII), $R_{15}$ and $R_{16}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups of the above groups are independently selected from a group consisting of F, Cl, Br, and I, if present.

The eighth compound represented by the formula (VIII) has a lower dielectric coefficient and can further adjust the clearing point, the optical anisotropy, the dielectric coefficient, the elastic coefficient, and the viscosity of the liquid crystal composition, so as to meet different needs for performances of the liquid crystal composition.

In some embodiments, $R_{15}$ and $R_{16}$ have the same ranges as $R_1$, and are independently selected to be the same as or different group from $R_1$, which will not be repeated here.

In some embodiments, the eighth compound in the liquid crystal composition has a mass percentage ranging from 0% to 15%, based on the total mass of the liquid crystal composition. Within the range of the mass percentage mentioned above, the eighth compound has good solubility at a low temperature, so as to improve the solubility of the liquid crystal composition. Furthermore, in some embodiments, the mass percentage of the eighth compound in the liquid crystal composition may be 1%, 5%, 8%, 10%, 12%, or 15%.

In some embodiments, the liquid crystal composition further includes at least one ninth compound represented by formula (IX):

(IX)

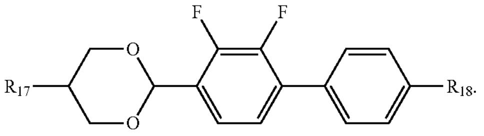

In the formula (IX), $R_{17}$ and $R_{18}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups of the above groups are independently selected from a group consisting of F, Cl, Br, and I, if present.

The ninth compound represented by the formula (IX) has a lower dielectric coefficient and can further adjust the clearing point, the optical anisotropy, the dielectric coefficient, the elastic coefficient, and the viscosity of the liquid crystal composition, so as to meet different needs for performances of the liquid crystal composition.

In some embodiments, $R_{17}$ and $R_{18}$ have the same ranges as $R_1$, and are independently selected to be the same as or different group from $R_1$, which will not be repeated here.

In some embodiments, the liquid crystal composition further includes at least one tenth compound represented by the following formula (X):

(X)

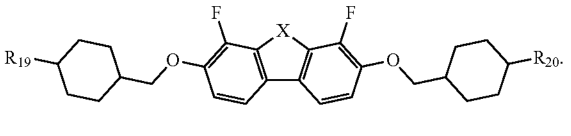

In the formula (X), $R_{19}$ and $R_{20}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups of the above groups are independently selected from a group consisting of F, Cl, Br, and I, if present.

The tenth compound represented by the formula (X) has a higher elastic coefficient and a higher dielectric coefficient, and can further adjust the dielectric coefficient and the elastic coefficient of the liquid crystal composition to meet different needs for performances of the liquid crystal composition.

In some embodiments, $R_{19}$ and $R_{20}$ have the same ranges as $R_1$, and are independently selected to be the same as or different group from $R_1$, which will not be repeated here.

In some embodiments, the liquid crystal composition further includes at least one eleventh compound represented by the following formula (XI):

(XI)

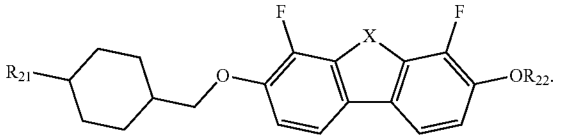

In the formula (XI), $R_{21}$ and $R_{22}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups of the above groups are independently selected from a group consisting of F, Cl, Br, and I, if present.

The eleventh compound represented by the formula (XI) has a higher elastic coefficient and a higher dielectric coefficient, and can further adjust the dielectric coefficient and the elastic coefficient of the liquid crystal composition to meet different needs for performances of the liquid crystal composition.

In some embodiments, $R_{21}$ and $R_{22}$ have the same ranges as $R_1$, and are independently selected to be the same as or different group from $R_1$, which will not be repeated here.

In the present disclosure, other than at least one first compound, at least one second compound, at least one third compound, and at least one fourth compound, the liquid crystal composition may further include one or more of at least one fifth compound, at least one sixth compound, at least one seventh compound, at least one eighth compound, at least one ninth compound, at least one tenth compound, and at least one eleventh compound.

In the present disclosure, the above-mentioned compounds in the liquid crystal composition can be combined according to the needs for performances of the liquid crystal composition. The following examples of the present disclosure only take some combinations of components including the above-mentioned compounds in the liquid crystal composition for illustration, and to demonstrate the performances of the liquid crystal composition by obtaining the property parameters of the liquid crystal composition, but not intended to limit the present disclosure.

In the following examples of the present disclosure, the liquid crystal compositions are prepared by a thermal dissolution method, which includes the following steps: step S10, mixing the compounds for preparing corresponding liquid crystal composition to obtain a mixture, in which the compounds are mixed in an order of melting points from low to high; step S20, heating and stirring the above mixture at a temperature ranging from 60° C. to 100° C., so that the compounds in the mixture is fully dissolved and uniformly mixed; and step S30, cooling the mixture to room temperature to obtain the liquid crystal composition.

Tables 1-7 illustrates the component distribution of the liquid crystal compositions provided by examples 1-7 of the present disclosure, respectively, and a table 8 illustrates the component distribution of the liquid crystal composition provided by a comparative example. The liquid crystal compositions provided by the example 7 is different from the liquid crystal composition provided by the comparative example in that the third compound is added to the liquid crystal composition.

For the property parameters of liquid crystal compositions in following examples 1-7 and comparative example, Tni (° C.) indicates a clearing point of the liquid crystal composition; $\gamma_1$ (mPa/s) indicates rotational viscosity of the liquid crystal composition at temperature of 25° C.; $\Delta n$ indicates a birefringence difference of the liquid crystal composition at temperature of 25° C., which represents the optical anisotropy of the liquid crystal composition; $n_e$ indicates refractive index of extraordinary ray; $\Delta\varepsilon$ indicates dielectric anisotropy of the liquid crystal composition at temperature of 25° C.; $\varepsilon^{\perp}$ indicates a dielectric constant value of the liquid crystal composition in a direction perpendicular to a long axis of liquid crystal molecules; $K_{11}$ indicates a splaying elastic coefficient of the liquid crystal composition; and $K_{33}$ indicates a bending elastic coefficient of the liquid crystal composition. In addition, the elastic coefficient (K) described in the present disclosure indicates an average elastic coefficient that is an average value of $K_{11}$ and $K_{33}$, unless otherwise specified.

Example 1

The compounds in the liquid crystal composition, and mass percentages of these compounds provided in the example 1 are shown in the following table 1.

TABLE 1

| Formula | Structure | Mass percentage (%) |
|---|---|---|
| V | 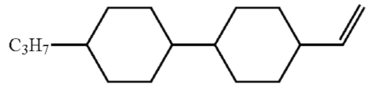 | 32.5 |
| V | 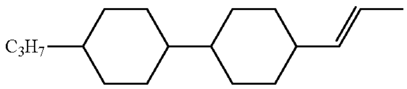 | 5.5 |
| IV | 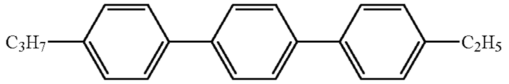 | 5 |
| VI | 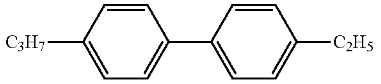 | 8 |

TABLE 1-continued
| Formula | Structure | Mass percentage (%) |
|---|---|---|
| II | 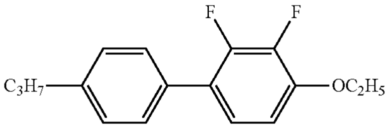 | 8 |
| I | 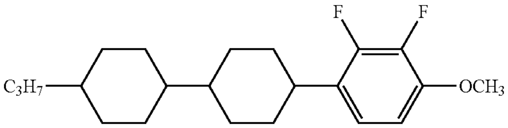 | 6 |
| I | 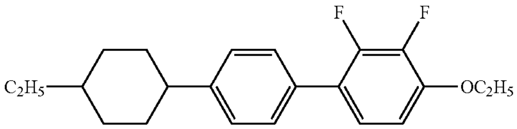 | 8 |
| VII | 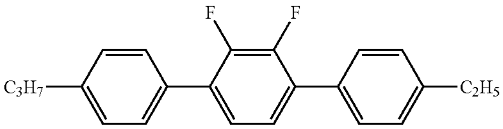 | 5 |
| II | 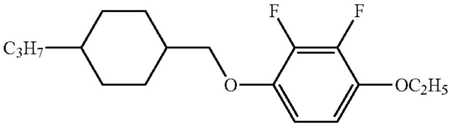 | 8 |
| X | 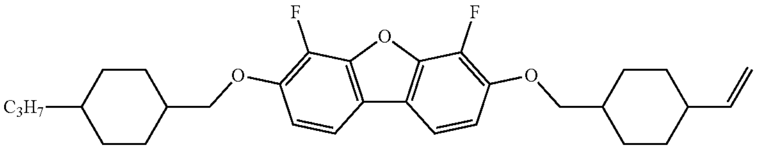 | 3 |
| III | 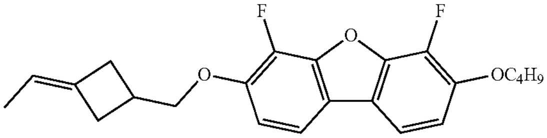 | 3 |
| I | 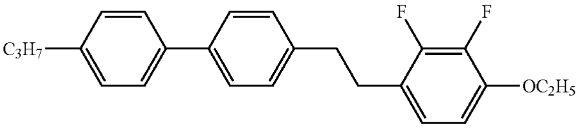 | 4 |
| I | 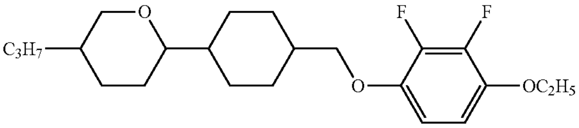 | 4 |

The liquid crystal composition in the example 1 has the following property parameters: Tni of 77° C., $\gamma_1$ of 67 mPa·s, $\Delta n$ of 0.112, $n_e$ of 1.604, $\Delta\varepsilon$ of −4.3, $\varepsilon^{\perp}$ of 8.2, $K_{11}$ of 13.6, and $K_{33}$ of 12.1, and there is no precipitation in the liquid crystal composition at −20° C. after 480 hours.

Example 2

The compounds in the liquid crystal composition, and mass percentages

TABLE 2

| Formula | Structure | Mass percentage (%) |
|---|---|---|
| V | 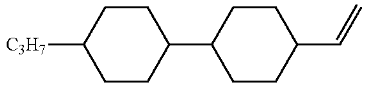 | 30.5 |
| V | 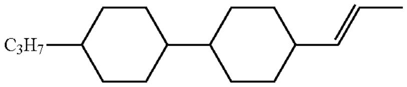 | 7.5 |
| VI | 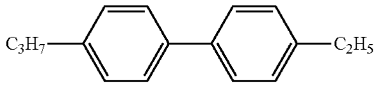 | 10 |
| IV |  | 8 |
| II | 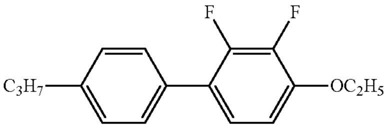 | 5 |
| I | 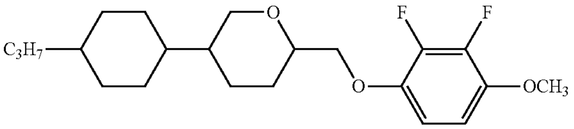 | 7 |
| I | 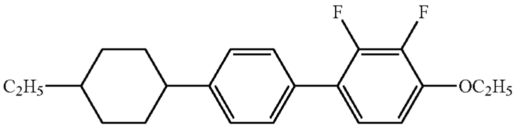 | 7 |
| VII | 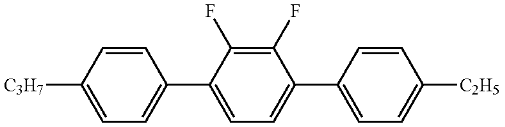 | 5 |
| II | 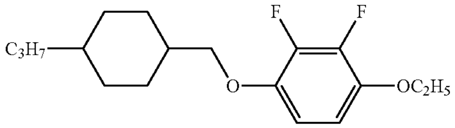 | 6 |
| III | 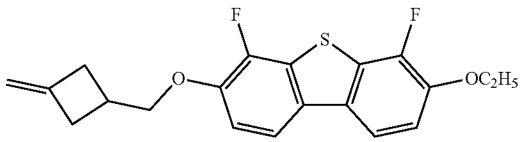 | 3 |
| III | 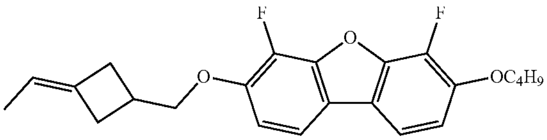 | 3 |

TABLE 2-continued

| Formula | Structure | Mass percentage (%) |
|---|---|---|
| I | 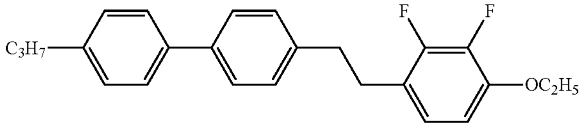 | 4 |
| I | 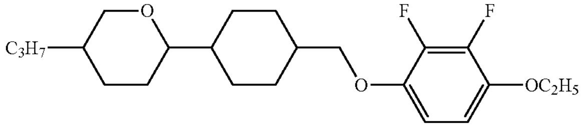 | 4 |

The liquid crystal composition in the example 2 has the following property parameters: Tni of 80° C., $\gamma_1$ of 69 mPa·s, Δn of 0.110, $n_e$ of 1.599, Δε of −4.4, $\varepsilon^{\perp}$ of 8.4, $K_{11}$ of 13.9, and $K_{33}$ of 12.8, and there is no precipitation in the liquid crystal composition at −20° C. after 480 hours.

Example 3

The compounds in the liquid crystal composition, and mass percentages of these compounds provided in the example 3 are shown in the following table 3.

TABLE 3

| Formula | Structure | Mass percentage (%) |
|---|---|---|
| V | 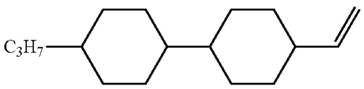 | 32 |
| V | 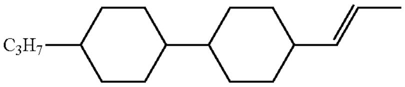 | 6 |
| VI | 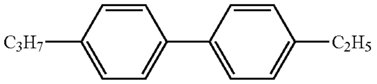 | 8 |
| IV | 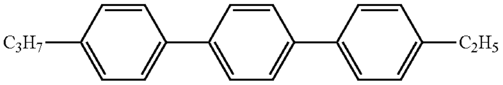 | 13 |
| II | 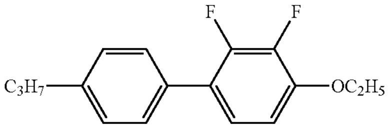 | 6 |
| II | 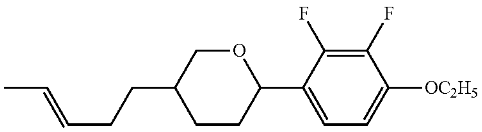 [SMILES: C/C=C/CCC1CCC(c2ccc(OCC)c(F)c2F)OC1] | 5 |
| I | 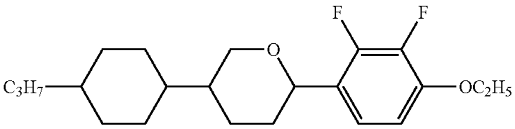 | 8 |
| I | 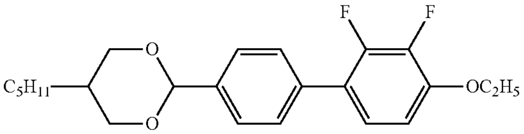 | 3 |

TABLE 3-continued

| Formula | Structure | Mass percentage (%) |
|---|---|---|
| VII | 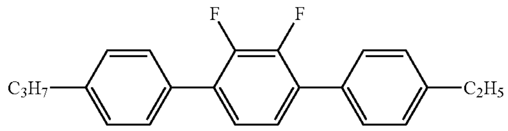 | 5 |
| IX | 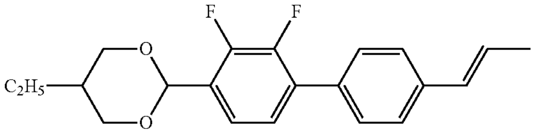 [SMILES: C/C=C/c1ccc(-c2ccc(C3OCC(CC)CO3)c(F)c2F)cc1] | 2 |
| III | 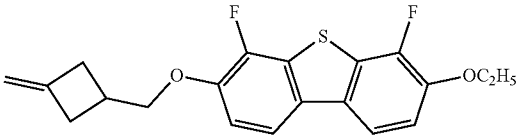 | 3 |
| III | 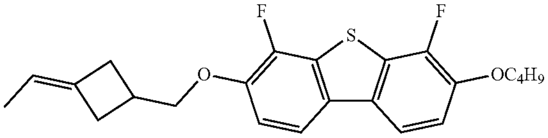 | 3 |
| XI | 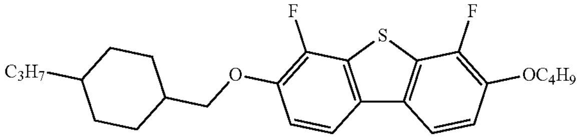 | 3 |
| I | 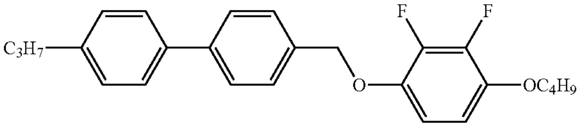 | 3 |

The liquid crystal composition in the example 3 has the following property parameters: Tni of 80° C., $\gamma_1$ of 68 mPa·s, Δn of 0.108, $n_e$ of 1.596, Δε of −4.1, $\varepsilon^{\perp}$ of 7.9, $K_{11}$ of 13.5, and $K_{33}$ of 13.7, and there is no precipitation in the liquid crystal composition at −20° C. after 480 hours.

Example 4

The compounds in the liquid crystal composition, and mass percentages

TABLE 4

| Formula | Structure | Mass percentage (%) |
|---|---|---|
| V | 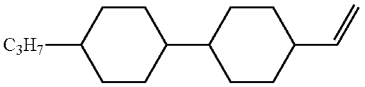 | 32 |
| V | 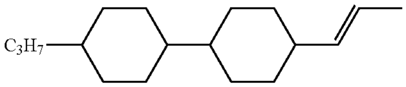 | 5 |
| IV | 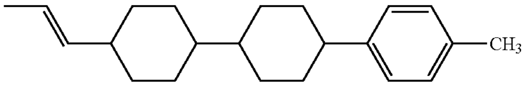 [SMILES: C/C=C/C1CCC(C2CCC(c3ccc(C)cc3)CC2)CC1] | 5 |
| I | 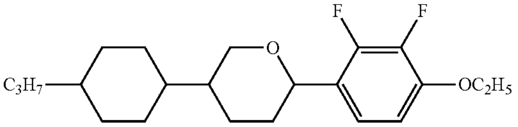 | 6 |

TABLE 4-continued

| Formula | Structure | Mass percentage (%) |
| --- | --- | --- |
| I | 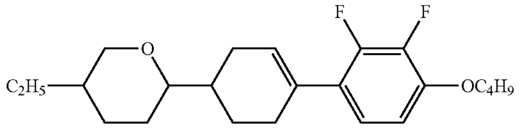 | 8 |
| I | 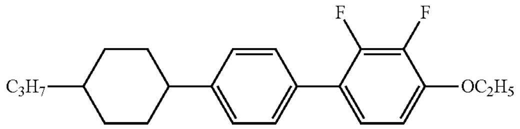 | 12 |
| I | 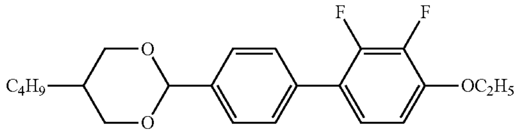 | 7 |
| II | 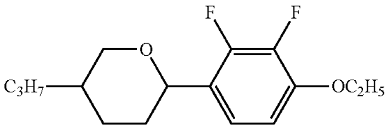 | 10 |
| II | 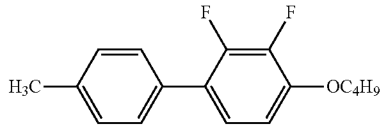 | 8 |
| III | 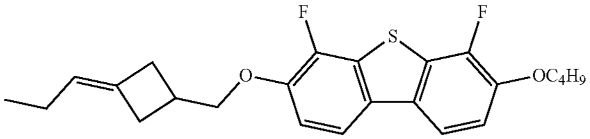 | 3 |
| III | 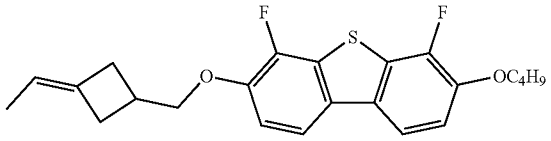 | 4 |

The liquid crystal composition in the example 4 has the following property parameters: Tni of 79° C., $\gamma_1$ of 75 mPa·s, $\Delta n$ of 0.119, $n_e$ of 1.611, $\Delta\varepsilon$ of −3.9, $\varepsilon^{\perp}$ of 7.8, $K_{11}$ of 14.3, and $K_{33}$ of 14.6, and there is no precipitation in the liquid crystal composition at −20° C. after 480 hours.

Example 5

The compounds in the liquid crystal composition, and mass percentages of these compounds provided in the example 5 are shown in the following table 5.

TABLE 5

| Formula | Structure | Mass percentage (%) |
| --- | --- | --- |
| V | 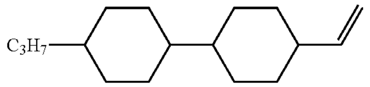 | 35 |
| V | 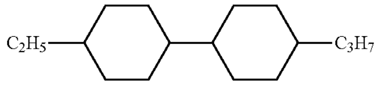 | 4 |
| IV | 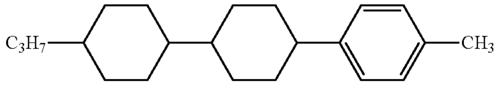 | 7 |

TABLE 5-continued

| Formula | Structure | Mass percentage (%) |
|---|---|---|
| IV | 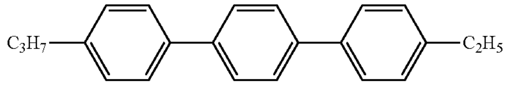 | 2 |
| II | 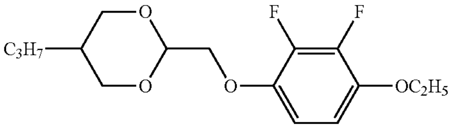 | 6 |
| I | 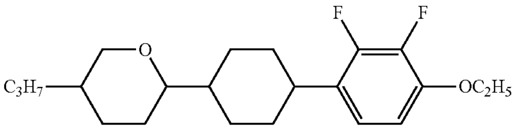 | 8 |
| I | 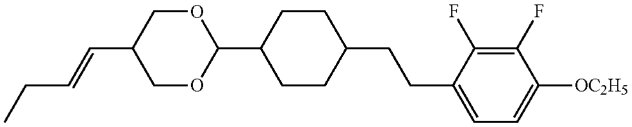 | 6 |
| I | 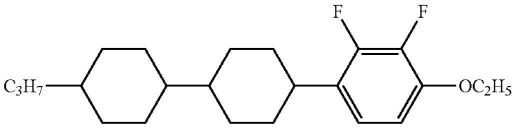 | 10 |
| II | 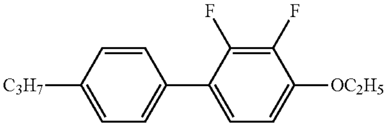 | 5 |
| I | 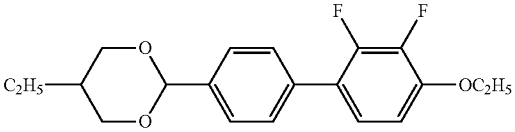 | 6 |
| VIII | 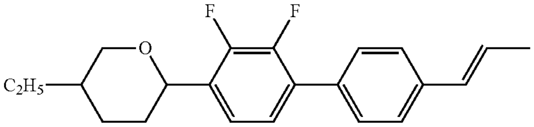 [SMILES: C/C=C/c1ccc(-c2ccc(C3CCC(CC)CO3)c(F)c2F)cc1] | 4 |
| III | 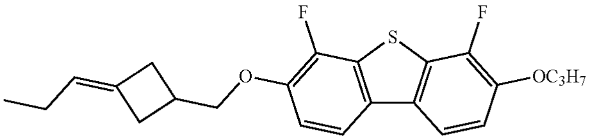 | 3 |
| III | 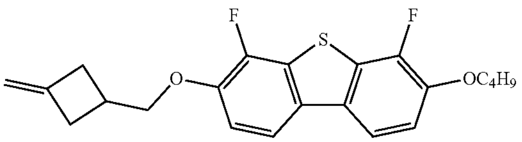 | 4 |

The liquid crystal composition in the example 5 has the following property parameters: Tni of 80° C., $\gamma_1$ of 73 mPa·s, $\Delta n$ of 0.116, $n_e$ of 1.609, $\Delta\varepsilon$ of −3.6, $\varepsilon^{\perp}$ of 7.6, $K_{11}$ of 13.7, and $K_{33}$ of 14.8, and there is no precipitation in the liquid crystal composition at −20° C. after 480 hours.

Example 6
The compounds in the liquid crystal composition, and mass percentages of these compounds provided in the example 6 are shown in the following table 6.
TABLE 6
| Formula | Structure | Mass percentage (%) |
|---|---|---|
| V | 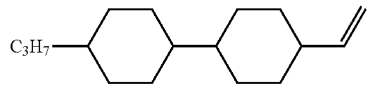 | 33 |
| V | 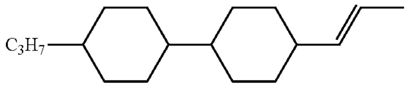 | 5 |
| IV | 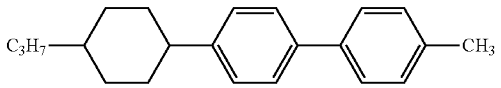 | 6 |
| II | 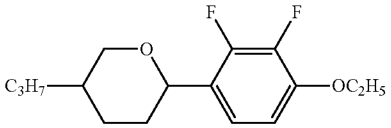 | 10 |
| I | 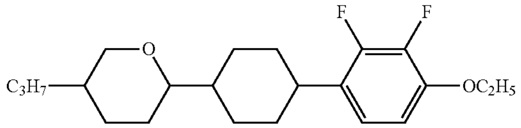 | 8 |
| I | 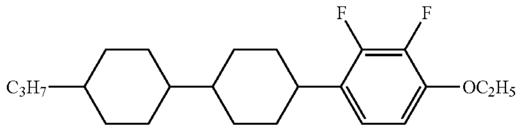 | 6 |
| I | 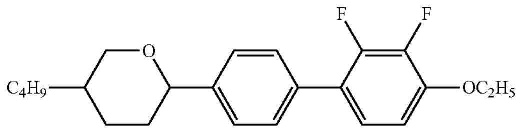 | 6 |
| I | 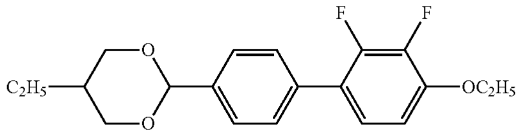 | 5 |
| I | 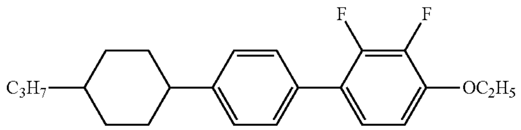 | 6 |
| IX | 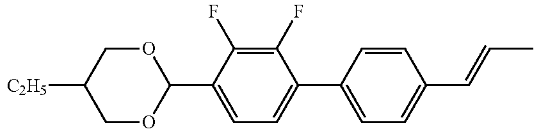 [SMILES: C/C=C/c1ccc(-c2ccc(C3OCC(CC)CO3)c(F)c2F)cc1] | 5 |
| II | 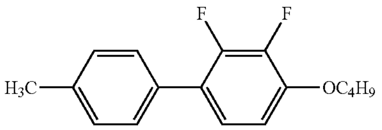 | 6 |

TABLE 6-continued

| Formula | Structure | Mass percentage (%) |
|---|---|---|
| III | 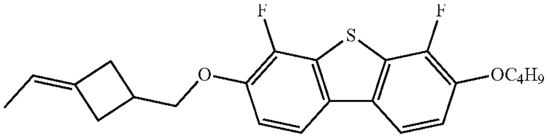 | 4 |

The liquid crystal composition in the example 6 has the following property parameters: Tni of 75° C., $\gamma_1$ of 71 mPa·s, $\Delta n$ of 0.119, $n_e$ of 1.614, $\Delta\varepsilon$ of −4.3, $\varepsilon^{\perp}$ of 8.0, $K_{11}$ of 14.0, and $K_{33}$ of 14.7, and there is no precipitation in the liquid crystal composition at −20° C. after 480 hours.

Example 7

The compounds in the liquid crystal composition, and mass percentages of these compounds provided in the example 7 are shown in the following table 7.

TABLE 7

| Formula | Structure | Mass percentage (%) |
|---|---|---|
| V | 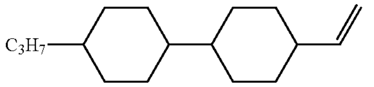 | 21 |
| V | 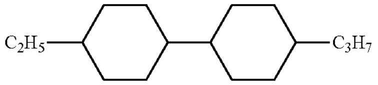 | 8 |
| IV | 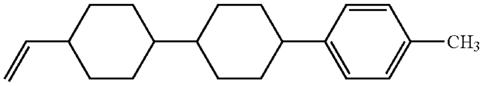 | 8 |
| IV | 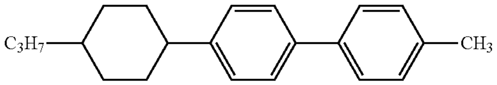 | 6 |
| IV | 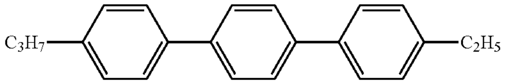 | 5 |
| I | 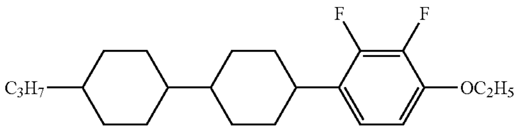 | 12 |
| I | 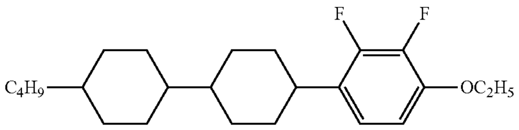 | 6 |
| I | 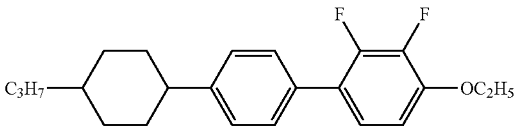 | 8 |
| II | 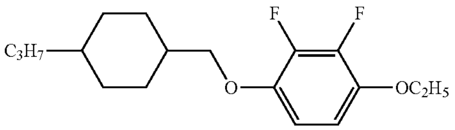 | 11 |

TABLE 7-continued

| Formula | Structure | Mass percentage (%) |
|---|---|---|
| II | 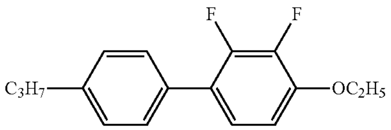 | 9 |
| III | 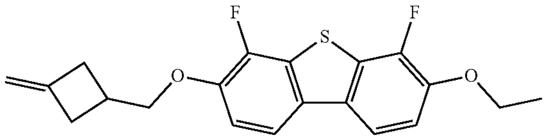 [SMILES: C=C1CC(COc2ccc3c(sc4c(F)c(OCC)ccc43)c2F)C1] | 3 |
| III | 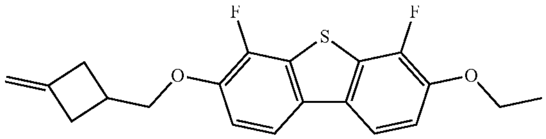 [SMILES: C=C1CC(COc2ccc3c(sc4c(F)c(OCC)ccc43)c2F)C1] | 3 |

The liquid crystal composition in the example 7 has the following property parameters: Tni of 88° C., $\gamma_1$ of 83 mPa·s, Δn of 0.120, $n_e$ Of 1.616, Δε of −4.0, $\varepsilon^\perp$ of 7.7, $K_{11}$ of 16.6, and $K_{33}$ of 16.8, and there is no precipitation in the liquid crystal composition at −20° C. after 480 hours.

Comparative Example

The compounds in the liquid crystal composition, and mass percentages of these compounds provided in the comparative example are shown in the following table 8.

TABLE 8

| Formula | Structure | Mass percentage (%) |
|---|---|---|
| V | 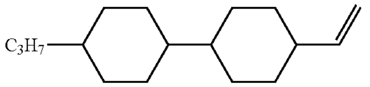 | 23 |
| V | 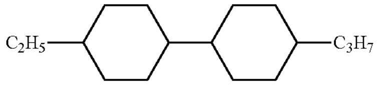 | 8 |
| IV | 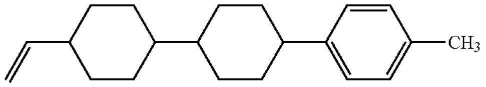 | 8 |
| IV | 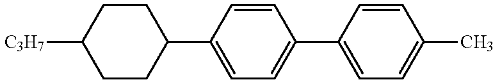 | 2 |
| IV | 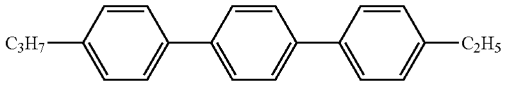 | 5 |
| I | 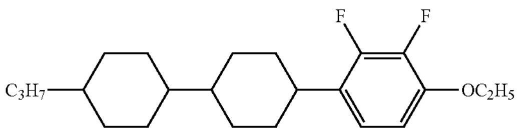 | 12 |
| I | 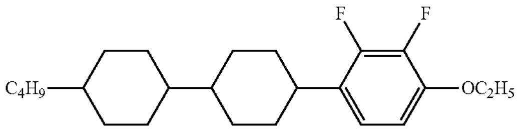 | 8 |

TABLE 8-continued

| Formula | Structure | Mass percentage (%) |
| --- | --- | --- |
| I | 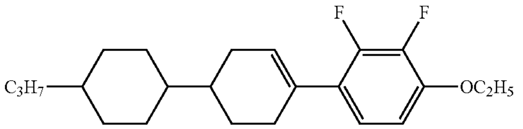 | 9 |
| II | 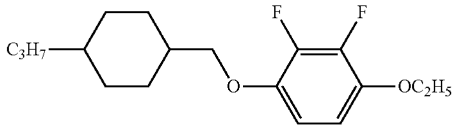 | 11 |
| II | 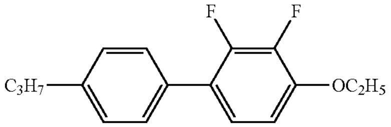 | 8 |
| I | 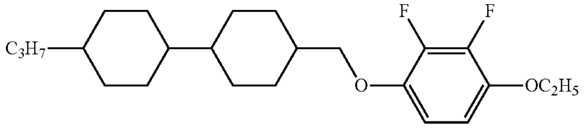 | 6 |

The liquid crystal composition in the comparative example has the following property parameters: Tni of 87° C., $\gamma_1$ of 89 mPa·s, Δn of 0.107, $n_e$ of 1.594, Δε of −3.7, $\varepsilon^{\perp}$ of 7.2, $K_{11}$ of 17.2, and $K_{33}$ of 18.2, and there is no precipitation in the liquid crystal composition at −20° C. after 480 hours.

Compared with the liquid crystal composition in the comparative example, the liquid crystal composition of examples 1-7 has an increased optical anisotropy (Δn) while maintaining an equivalent clearing point (Tni), which can improve the penetration rate of liquid crystals; an absolute value of the dielectric anisotropy (|Δε|) of the liquid crystal composition of examples 1-7 increases, and thus an absolute value between the elastic coefficient and |Δε|(|K/Δε|) decreases, which can reduce the threshold voltage to improve the driving voltage for liquid crystals; the viscosity (γ1) of the liquid crystal composition of examples 1-7 decreases, and thus a ratio of γ1 to K (γ1/K) decreases, which can reduce the response time of liquid crystals to improve the response speed of liquid crystals.

It can be understood that, the response time of liquid crystals is positively correlated with the rotational viscosity (γ1), and is negatively correlated with the dielectric anisotropy (Δε) or the splaying elastic coefficient ($K_{11}$). The rotational viscosity (γ1) of the liquid crystal compositions of examples 1-7 is within the range of 70 mPa·s to 85 mPa·s, which is significantly lower than the rotational viscosity (γ1) of the liquid crystal composition in the comparative example. Therefore, when the liquid crystal composition of the present disclosure is used in display devices as liquid crystals, the response time of the liquid crystals can be reduced to improve the response speed. In addition, the dielectric anisotropy (Δε) of the liquid crystal compositions provided in the examples 1-7 of the present disclosure ranges from −3.6 to −4.4, that is, the liquid crystal compositions in the examples 1-7 of the present disclosure have higher negative dielectric anisotropy. Moreover, the optical anisotropy (Δn) of the liquid crystal compositions provided in the examples 1-7 of the present disclosure ranges from 0.108 to 0.120. Therefore, the present disclosure can achieve adjustability of the dielectric anisotropy (Δε) and the optical anisotropy (Δn) of liquid crystal compositions through the combination of different compounds to meet the needs for fast response liquid crystals.

In addition, in terms of power consumption, for liquid crystal display panels with lower power consumption, the driving voltage needs to be reduced and the penetration rate of the display panel needs to be increased to reduce the overall power consumption. Such products often use large thicknesses of cells having a supporting column with a height ranging from 2.0 μm to 3.8 μm, and use liquid crystals have higher optical anisotropy (Δn) to improve the transmissivity of liquid crystals and reduce backlight loss. For the liquid crystal compositions provided in the examples 1-7 of the present disclosure, since the optical anisotropy (Δn) is significantly higher than that of the liquid crystal composition in the comparative example, and the liquid crystal compositions of examples 1-7 have higher dielectric anisotropy (Δε), when the liquid crystal compositions of examples 1-7 are used in liquid crystal display panels, the threshold voltage of liquid crystal display panels can be reduced, which can reduce the driving voltage for liquid crystal display panels.

Further, for the liquid crystal compositions provided in the examples 1-7 of the present disclosure, the clearing points (Tni) are greater than 75° C., allowing the liquid crystal compositions to achieve an ideal liquid crystal phase within a wide temperature range.

Based on the above, by combining different compounds, the present disclosure can obtain liquid crystal compositions with the required performances such as the penetration rate, the response time, and the driving voltage of liquid crystals.

Embodiments of the present disclosure further provide a display panel, referring to FIG. 1, a display panel 100 provided by some embodiments of the present disclosure includes a first substrate 10, a second substrate 30, and a liquid crystal layer 20. The first substrate 10 is disposed facing and the second substrate 30, and the liquid crystal layer 20 is disposed between the first substrate 10 and the second substrate 30. A material of the liquid crystal layer 20 includes the liquid crystal composition as described in the description above. The first substrate 10 may be an array substrate, and the second substrate 20 is a color film substrate. Specific structures of the array substrate and the color film substrate can refer to the prior art and will not be repeated here.

The present disclosure improves the response speed and penetration rate of the display panel and reduce the driving voltage for the display panel by using the liquid crystal composition described in any of the above-mentioned embodiments or examples.

It can be understood that the display panel in the present disclosure may be a vertical alignment (VA) display panel, an electrically controlled birefringence (ECB) display panel, a plasma addressed liquid cystal (PALC) display panel, a fringe field switching (FFS) display panel, an in-plane switching (IPS) display panel, or the like. In particular, when the display panel is the VA display panel that has good negative dielectric anisotropy and high contrast, by using the liquid crystal composition of the present disclosure as the liquid crystal material in the VA display panel, a display panel with high contrast, fast response speed, high penetration rate, and low driving voltage can be obtained, thereby expanding the application range of the display panel in display products.

Embodiments of the present disclosure further provide an electronic device, which includes not only the display panel mentioned above, but also other components such as an earpiece, a camera, an optical fingerprint recognition device, and the like. The electronic device includes, but not limited to, a mobile phone, a television, a computer, a tablet, a watch, or the like.

In the above embodiments, the descriptions of each embodiment have their own emphasis. For parts that are not detailed in one embodiment, please refer to the relevant descriptions of other embodiments.

The above contents provide a detailed description to the liquid crystal composition and the display panel provided in the embodiments of the present disclosure. Specific embodiments are applied in this context to explain the principles and implementation methods of the present disclosure. The explanation of the above-mentioned embodiments is only used to help understand the technical solutions and core ideas of the present disclosure. Ordinary skilled in the art should understand that they can still modify the technical solutions recorded in the above-mentioned embodiments, or equivalently replace some of the technical features; and these modifications or replacements do not separate the essence of the corresponding technical solutions from the scope of the technical solutions of the various embodiments of the present disclosure.

What is claimed is:

1. A liquid crystal composition comprising:

a first compound represented by formula (I);

(I)

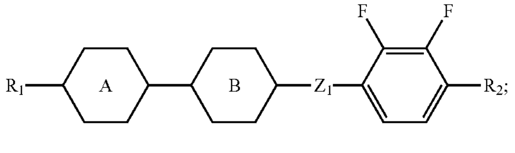

a second compound represented by formula (II);

(II)

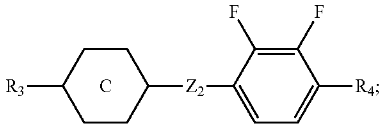

a third compound represented by formula (III);

(III)

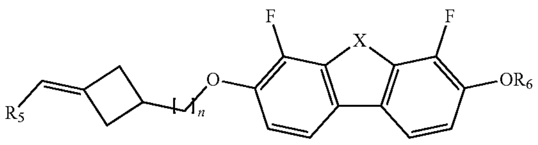

and a fourth compound represented by formula (IV);

(IV)

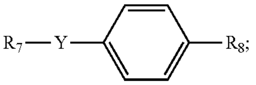

wherein

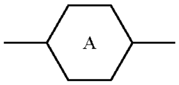

is selected from a group consisting of following substituted or unsubstituted groups:

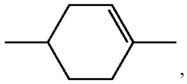,
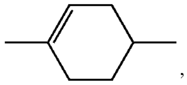,
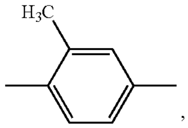, 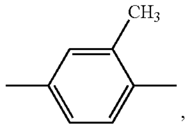,
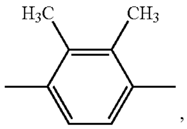, 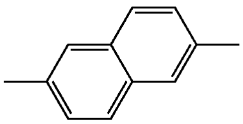,
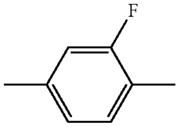, 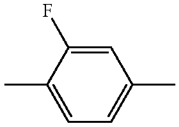, -continued

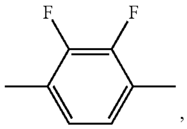, 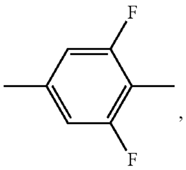,

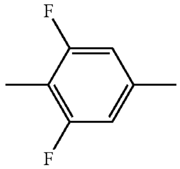, 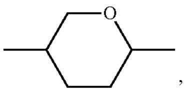,

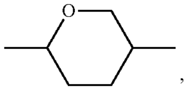, 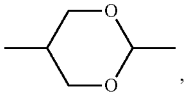,

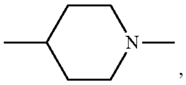, 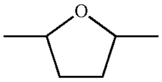, 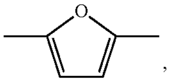,

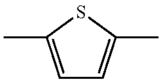, 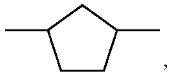, 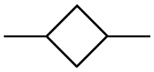,

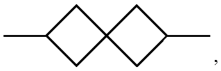, and , and substituent groups thereof are independently selected from a group consisting of F, Cl, Br, and I,

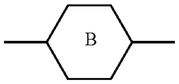 and 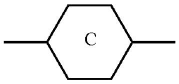

are independently selected from a group consisting of following substituted or unsubstituted groups:

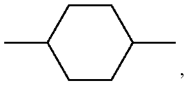, 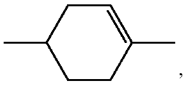,

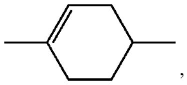, 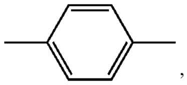,

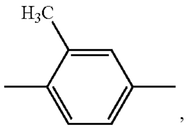, 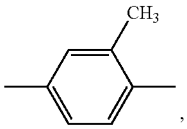,

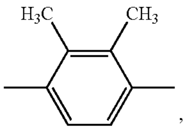, 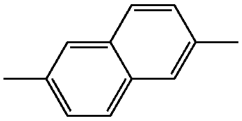,

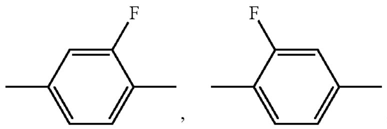,

-continued

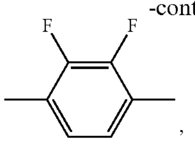, 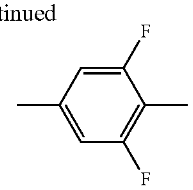,

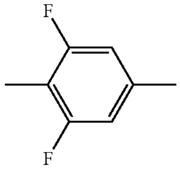, 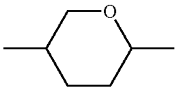,

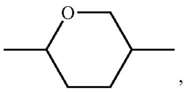, 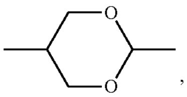,

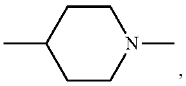, 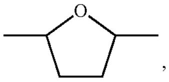, 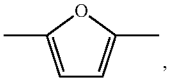,

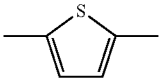, 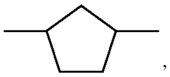, 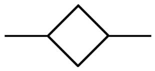,

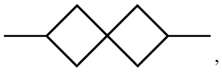, and , and substituent groups thereof are independently selected from a group consisting of F, Cl, Br, and I;

$Z_1$ and $Z_2$ are independently selected from a group consisting of a single bond, —O—, —S—, —$SO_2$—, —CO—, —C(O)O—, —OC(O)—, —OC(O)O—, and —C≡C—; or $Z_1$ and $Z_2$ are independently selected from a group consisting of following substituted or unsubstituted groups: —$CH_2$O—, —O$CH_2$—, —$CH_2$—$CH_2$—, —$(CH_2)_3$—, and —CH═CH—, and substituent groups thereof are independently selected from a group consisting of F, Cl, Br, and I;

X is selected from O or S;

n is selected from 0, 1, or 2;

Y is selected from

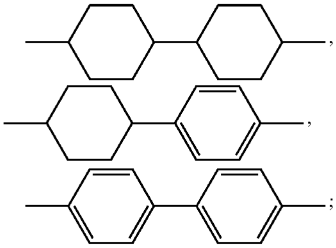 or ;

and $R_1$ to $R_8$ are independently selected from a group consisting of —H, —F, —Cl, —Br, —I, —CN, —SCN, —NCS, and —SF; or, $R_1$ to $R_8$ are independently selected from a group consisting of a substituted or unsubstituted alkyl group having 1-15 carbon atoms, a substituted or unsubstituted alkoxy group having 1-15 carbon atoms, a substituted or unsubstituted alkenyl group having 2-15 carbon atoms, a substituted or unsubstituted alkenyloxy group having 2-15 carbon atoms, a substituted or unsubstituted alkynyl group having 2-15 carbon atoms, and a substituted or unsubstituted alkynyloxy group having 2-15 carbon atoms, and substituent groups thereof are independently selected from a group consisting of F, Cl, Br, and I.

2. The liquid crystal composition of claim 1, wherein one or more end groups of $R_1$ to $R_8$ are independently selected from a group consisting of —H, —CN, and —$CF_3$; and/or one or more —$CH_2$-groups in at least one of $R_1$ to $R_8$ are independently replaced by any one selected from a group consisting of —O—, —S—, —$SO_2$—, —CO—, —C(O)O—, —OC(O)—, —OC(O)O—, and —C≡C—; or, one or more —$CH_2$— groups in at least one of $R_1$ to $R_8$ are independently replaced by any one selected from a group consisting of following substituted or unsubstituted groups: —$CH_2$O—, —O$CH_2$—, —$CH_2$—$CH_2$—, —$(CH_2)_3$—, and —CH═CH—, and substituent groups thereof are independently selected from a group consisting of F, Cl, Br, and I.

3. The liquid crystal composition of claim 2, wherein one or more —$CH_2$— groups in at least one of $R_1$ to $R_8$ are independently replaced by any one selected from a group consisting of following substituted or unsubstituted groups: —$CH_2$O—, —O$CH_2$—, —$CH_2$—$CH_2$—, —$(CH_2)_3$—, and —CH═CH—, and substituent groups thereof are F.

4. The liquid crystal composition of claim 1, wherein the first compound is represented by any one selected from the following formulae:

I-12

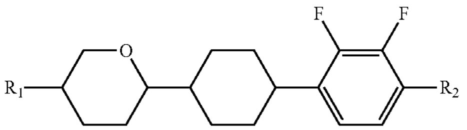

I-13

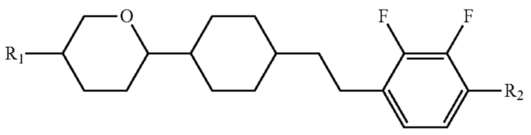

I-14

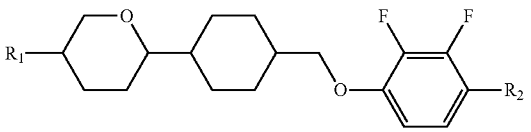

I-15

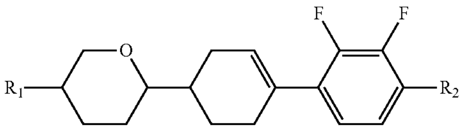

I-16

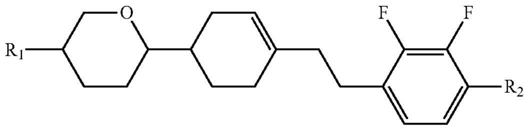

I-17

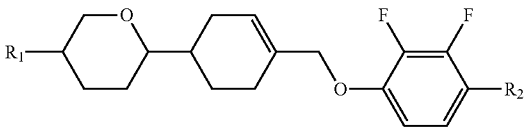

-continued

I-18

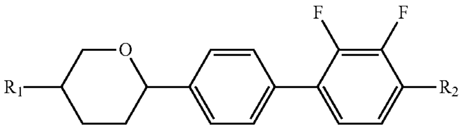

I-19

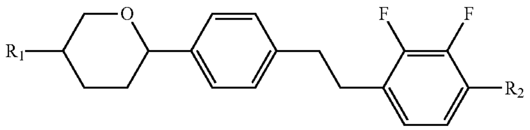

I-20

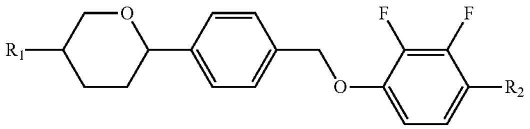

I-21

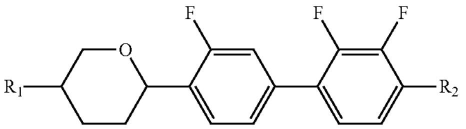

I-25

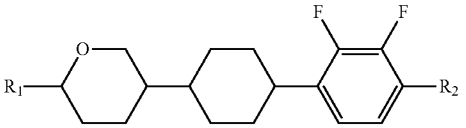

I-26

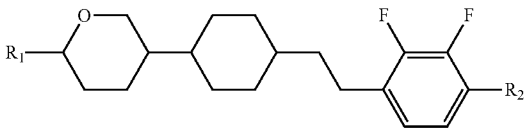

I-27

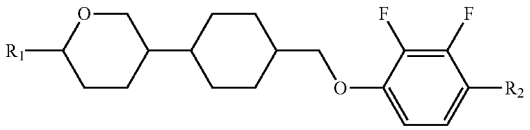

I-28

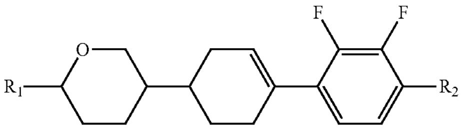

I-29

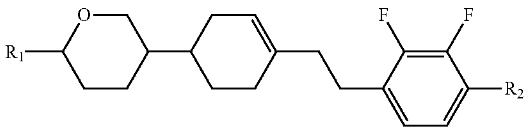

I-30

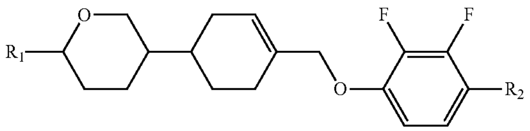

-continued
I-31
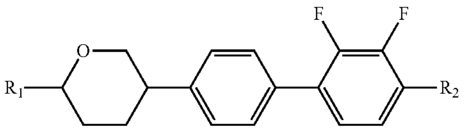
I-32
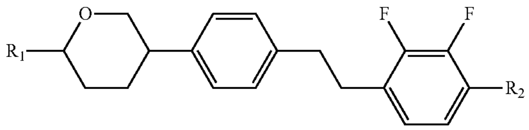
I-33
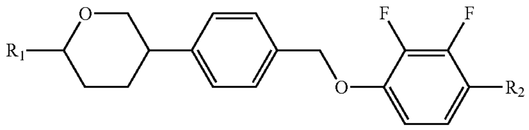
I-34
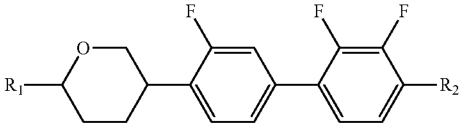
I-38
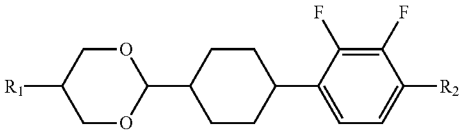
I-39
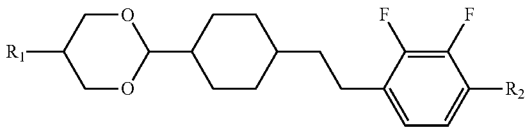
I-40
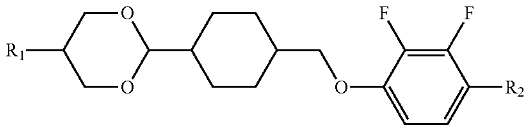
I-41
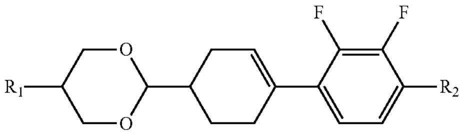
I-42
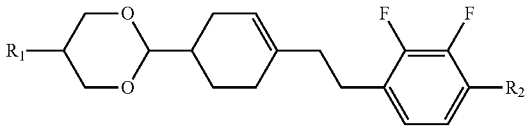
I-43
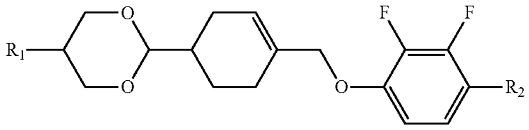
-continued
I-44
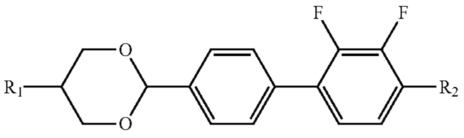
I-45
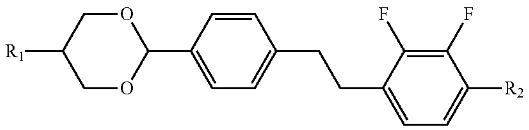
I-46
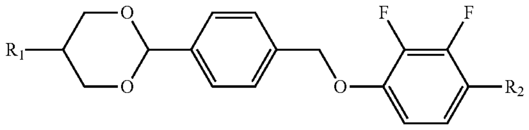
I-47
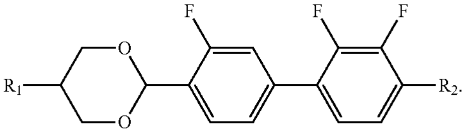
5. The liquid crystal composition of claim 1, wherein the second compound is represented by any one selected from a group consisting of formula (II-1) to formula (II-15):
II-1
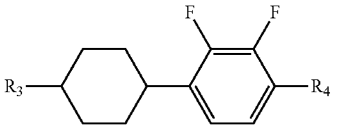
II-2
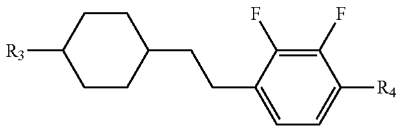
II-3
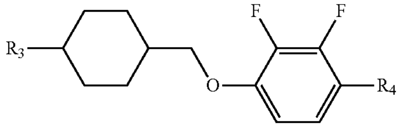
II-4
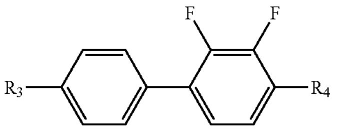
II-5
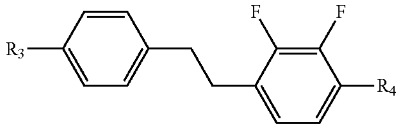
II-6
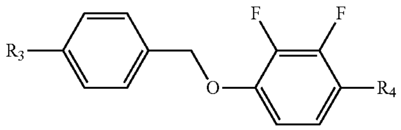

-continued

II-7

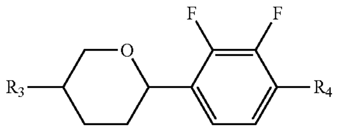

II-8

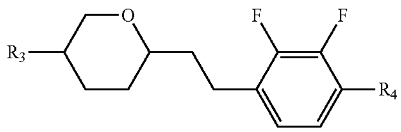

II-9

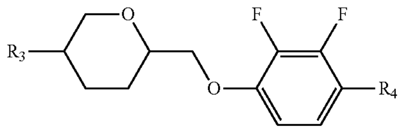

II-10

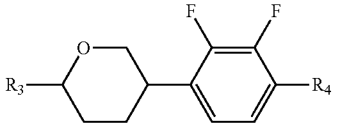

II-11

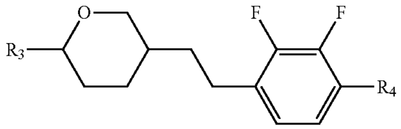

II-12

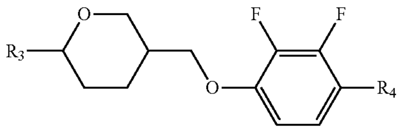

II-13

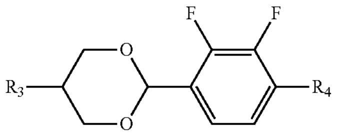

II-14

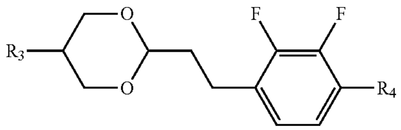

II-15

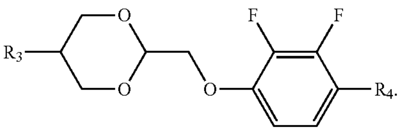

6. The liquid crystal composition of claim 1, wherein the third compound is represented by any one selected from a group consisting of formula (III-1) to formula (III-6):

III-1

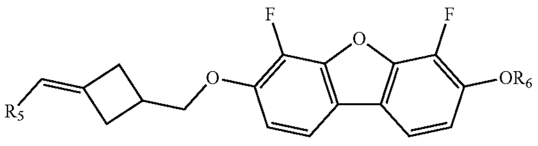

-continued

III-2

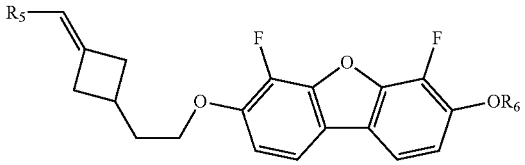

III-3

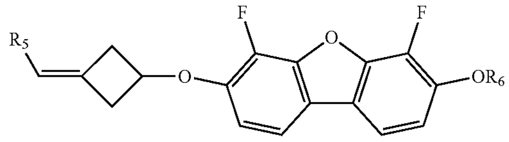

III-4

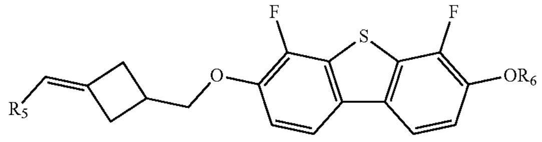

III-5

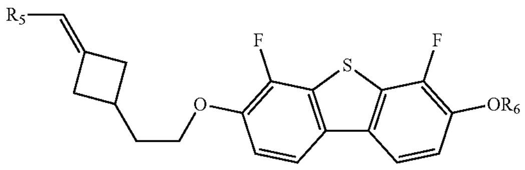

III-6

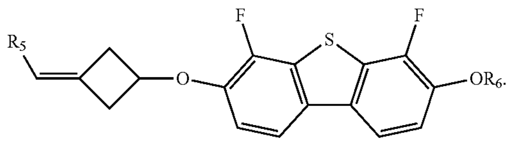

7. The liquid crystal composition of claim 1, wherein the fourth compound is represented by any one selected from a group consisting of formula (IV-1), formula (IV-2), and formula (IV-3):

(IV-1)

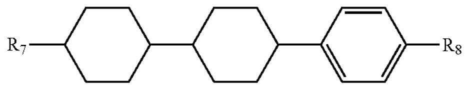

(IV-2)

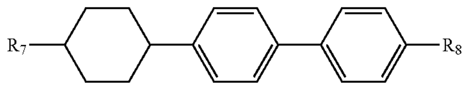

(IV-3)

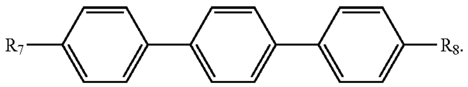

8. The liquid crystal composition of claim 7, wherein the fourth compound is represented by any one selected from a group consisting of formula (IV-1-1) to formula (IV-3-12):

IV-1-1
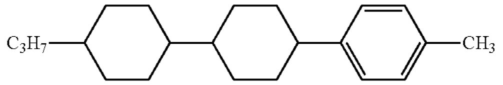
IV-1-2
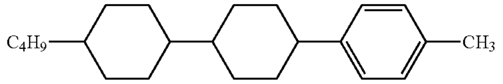
IV-1-3
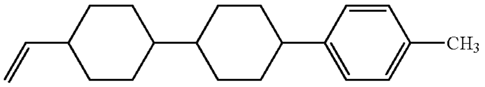 [SMILES: C=CC1CCC(C2CCC(c3ccc(C)cc3)CC2)CC1]
IV-1-4
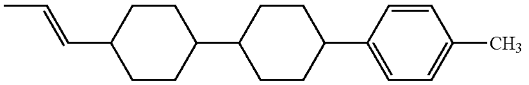
IV-1-5
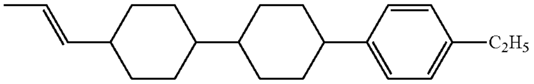
IV-1-6
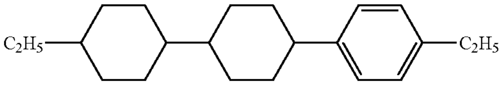
IV-1-7
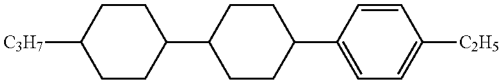
IV-1-8
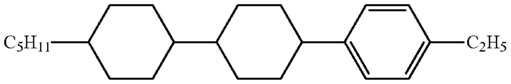
IV-1-9
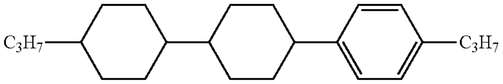
IV-1-10
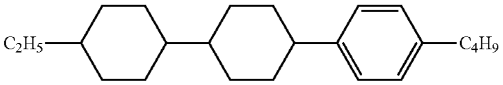
IV-1-11
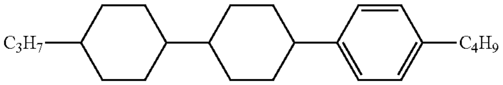
IV-1-12
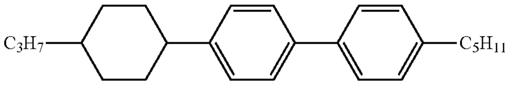
IV-2-1
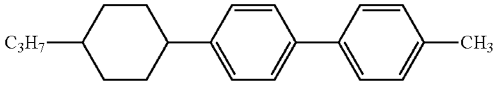
-continued
IV-2-2
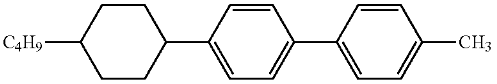
IV-2-3
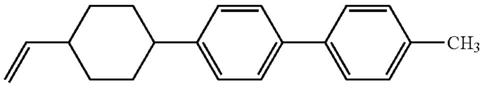
IV-2-4
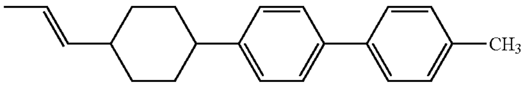
IV-2-5
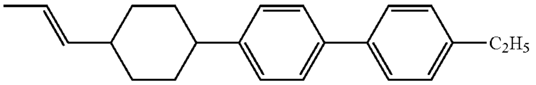
IV-2-6
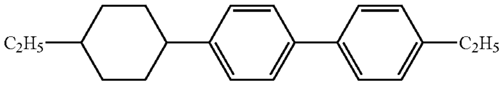
IV-2-7
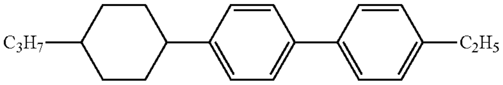
IV-2-8
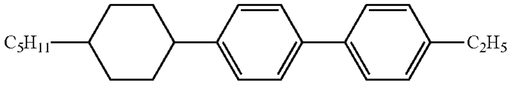
IV-2-9
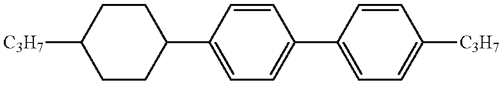
IV-2-10
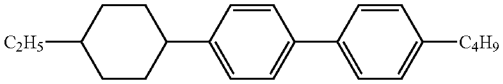
IV-2-11
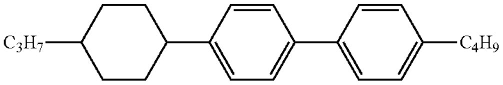
IV-2-12
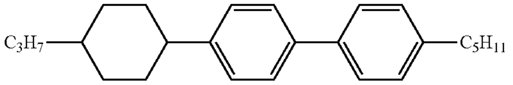
IV-3-1
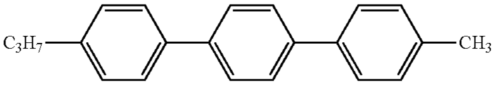
IV-3-2
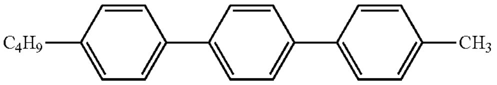
IV-3-3
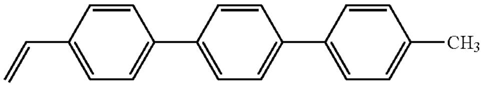

-continued

IV-3-4

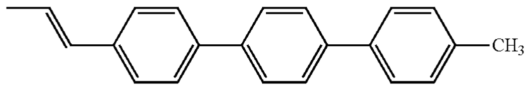

IV-3-5

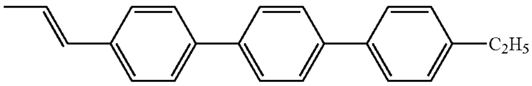

IV-3-6

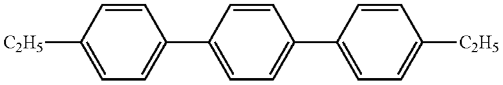

IV-3-7

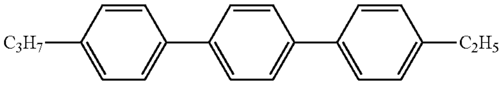

IV-3-8

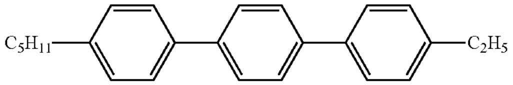

-continued

IV-3-9

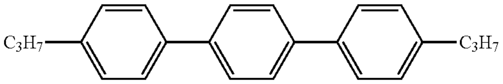

-continued

IV-3-10

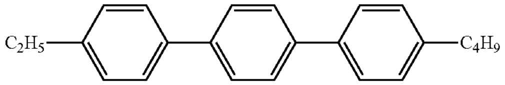

IV-3-11

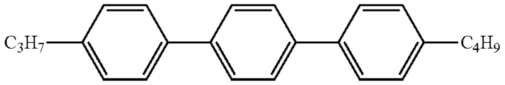

IV-3-12

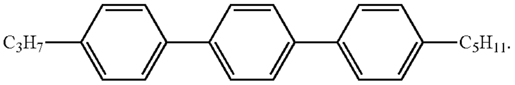

9. The liquid crystal composition of claim 1, wherein the liquid crystal composition further comprises one or more compounds represented by formula (V) to formula (XI):

(V)

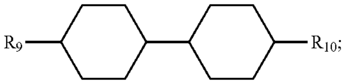

(VI)

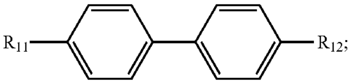

(VII)

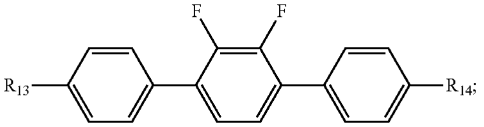

(VIII)

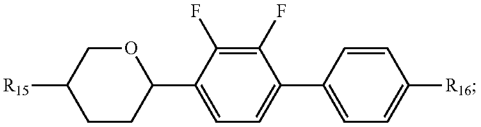

(IX)

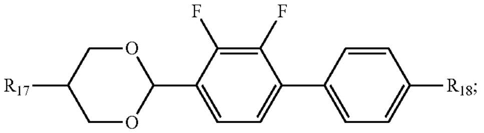

(X)

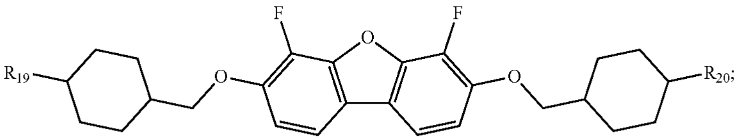

and (XI)

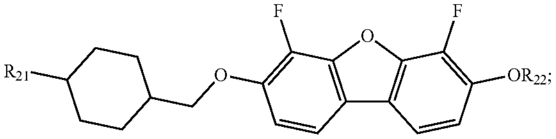

wherein $R_9$-$R_{22}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups thereof are independently selected from a group consisting of F, Cl, Br, and I.

10. The liquid crystal composition of claim 1, wherein the liquid crystal composition further comprises one or more compounds represented by formula (V):

(V)

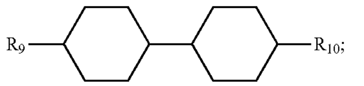

wherein $R_9$-$R_{10}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups thereof are independently selected from a group consisting of F, Cl, Br, and I.

11. The liquid crystal composition of claim 1, wherein the liquid crystal composition further comprises one or more compounds represented by formula (V) to formula (VII):

(V)

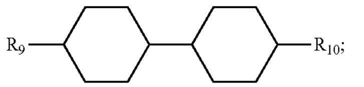

(VI)

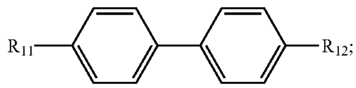

and (VII)

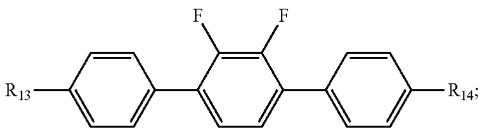

wherein $R_9$-$R_{14}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups thereof are independently selected from a group consisting of F, Cl, Br, and I.

12. The liquid crystal composition of claim 1, wherein the liquid crystal composition further comprises one or more compounds represented by formula (V) to formula (VII) and formula (X):

(V)

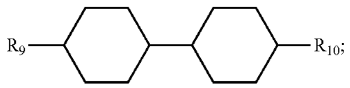

(VI)

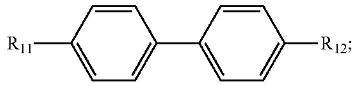

(VII)

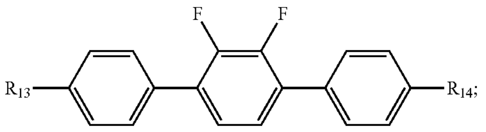

and (X)

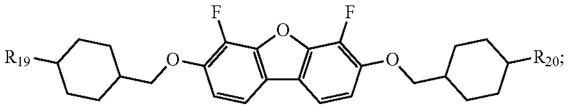

wherein $R_9$-$R_{14}$ and $R_{19}$-$R_{20}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups thereof are independently selected from a group consisting of F, Cl, Br, and I.

13. The liquid crystal composition of claim 1, wherein the liquid crystal composition further comprises one or more compounds represented by formula (V) to formula (VII), formula (IX), and formula (XI):

(V)

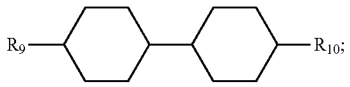

(VI)

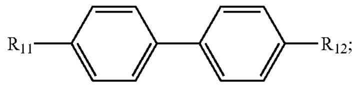

(VII)

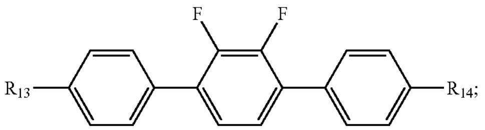

(IX)

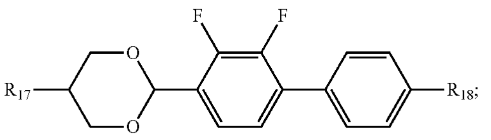

and

-continued (XI)

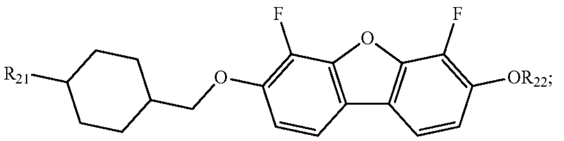

wherein $R_9$-$R_{14}$, $R_{17}$-$R_{18}$, and $R_{21}$-$R_{22}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups thereof are independently selected from a group consisting of F, Cl, Br, and I.

14. The liquid crystal composition of claim 1, wherein the liquid crystal composition further comprises one or more compounds represented by formula (V) and formula (VIII):

(V)

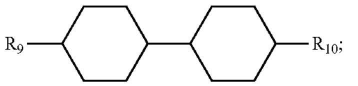

and (VIII)

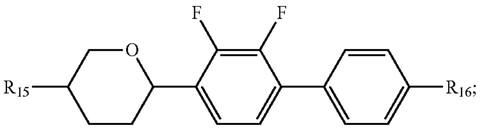

wherein $R_9$-$R_{10}$ and $R_{15}$-$R_{16}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups thereof are independently selected from a group consisting of F, Cl, Br, and I.

15. The liquid crystal composition of claim 1, wherein the liquid crystal composition further comprises one or more compounds represented by formula (V) and formula (IX):

(V)

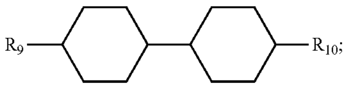

and (IX)

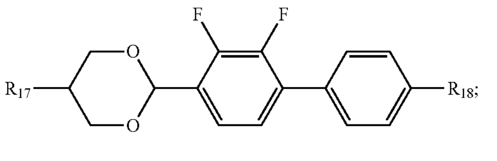

wherein $R_9$-$R_{10}$ and $R_{17}$-$R_{18}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups thereof are independently selected from a group consisting of F, Cl, Br, and I.

16. The liquid crystal composition of claim 1, wherein the liquid crystal composition further comprises one or more compounds represented by formula (V) and formula (X):

(V)

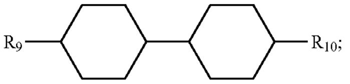

and (X)

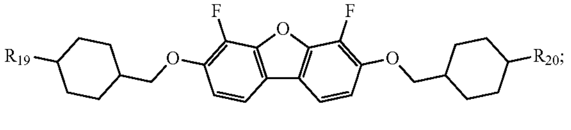

wherein $R_9$-$R_{10}$ and $R_{19}$-$R_{20}$ are independently selected from a group consisting of a substituted or unsubstituted alkyl group having 1-10 carbon atoms, a substituted or unsubstituted alkoxy group having 1-10 carbon atoms, a substituted or unsubstituted alkenyl group having 2-10 carbon atoms, a substituted or unsubstituted alkenyloxy group having 2-10 carbon atoms, a substituted or unsubstituted alkynyl group having 2-10 carbon atoms, and a substituted or unsubstituted alkynyloxy group having 2-10 carbon atoms, and substituent groups thereof are independently selected from a group consisting of F, Cl, Br, and I.

17. The liquid crystal composition of claim 1, wherein $R_1$ to $R_8$ are independently selected from a group consisting of methyl, ethyl, propyl, butyl, pentyl, vinyl, prop-1-enyl, prop-2-enyl, but-1-enyl, but-2-enyl, but-3-enyl, pent-1-enyl, pent-2-enyl, pent-3-enyl, pent-4-enyl, acetylenyl, prop-1-ynyl, prop-2-ynyl, but-1-ynyl, but-2-ynyl, but-3-ynyl, pent-1-ynyl, pent-2-ynyl, pent-3-ynyl, and pent-4-ynyl.

18. A display panel comprising a first substrate and a second substrate disposed facing the first substrate, and a liquid crystal layer disposed between the first substrate and the second substrate, wherein a material of the liquid crystal layer comprises a liquid crystal composition comprising:

a first compound represented by formula (I);

(I)

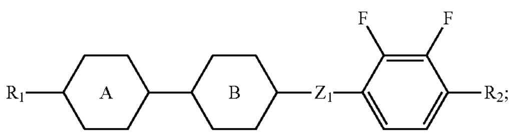

a second compound represented by formula (II);

(II)

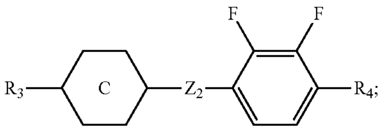

a third compound represented by formula (III);

(III)

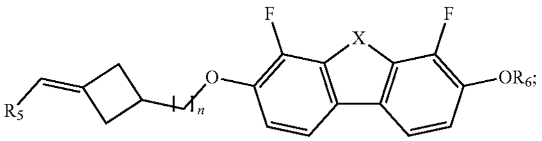

and a fourth compound represented by formula (IV);

(IV)

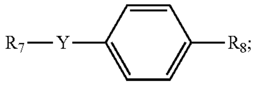

wherein

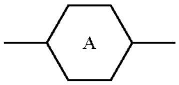

is selected from a group consisting of following substituted or unsubstituted groups:

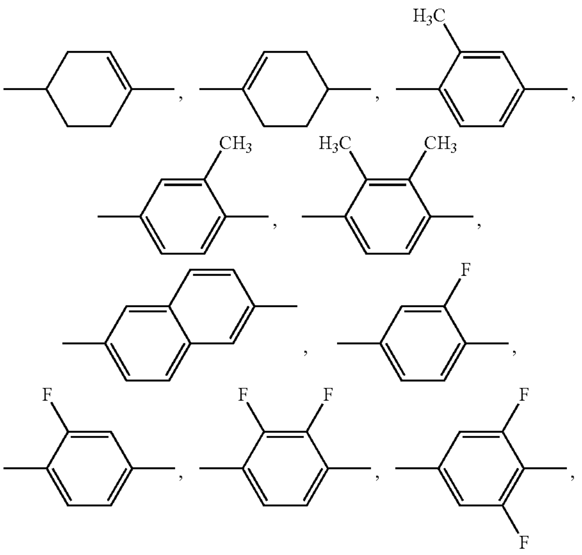

-continued

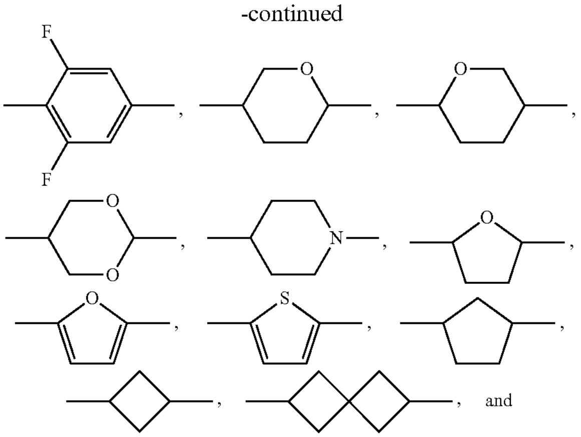

and

and substituent groups thereof are independently selected from a group consisting of F, Cl, Br, and I,

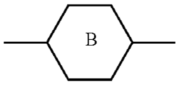

and

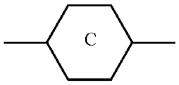

are independently selected from a group consisting of following substituted or unsubstituted groups:

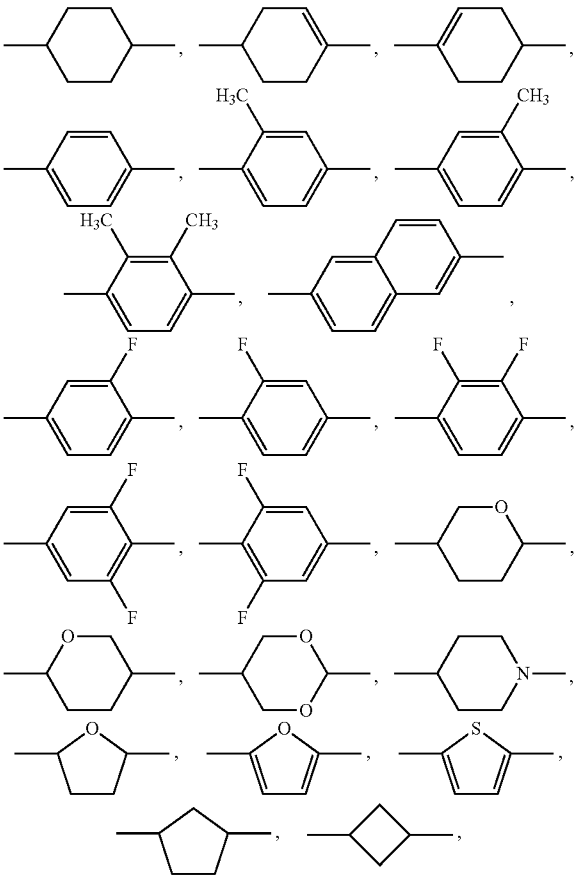

-continued

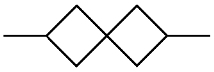, and , and substituent groups thereof are independently selected from a group consisting of F, Cl, Br, and I;

$Z_1$ and $Z_2$ are independently selected from a group consisting of a single bond, —O—, —S—, —$SO_2$—, —CO—, —C(O)O—, —OC(O)—, —OC(O)O—, and —C≡C—; or $Z_1$ and $Z_2$ are independently selected from a group consisting of following substituted or unsubstituted groups:—$CH_2O$—, —$OCH_2$—, —$CH_2$—$CH_2$—, —$(CH_2)_3$—, and —CH═CH—, and substituent groups thereof are independently selected from a group consisting of F, Cl, Br, and I;

X is selected from O or S;

n is selected from 0, 1, or 2;

Y is selected from

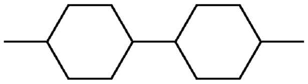,

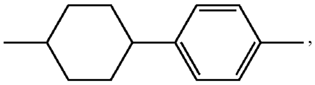, or

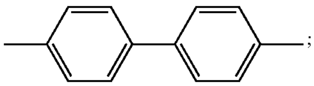;

and $R_1$ to $R_8$ are independently selected from a group consisting of —H, —F, —Cl, —Br, —I, —CN, —SCN, —NCS, and —SF; or, $R_1$ to $R_8$ are independently selected from a group consisting of a substituted or unsubstituted alkyl group having 1-15 carbon atoms, a substituted or unsubstituted alkoxy group having 1-15 carbon atoms, a substituted or unsubstituted alkenyl group having 2-15 carbon atoms, a substituted or unsubstituted alkenyloxy group having 2-15 carbon atoms, a substituted or unsubstituted alkynyl group having 2-15 carbon atoms, and a substituted or unsubstituted alkynyloxy group having 2-15 carbon atoms, and substituent groups thereof are independently selected from a group consisting of F, Cl, Br, and I.

19. The liquid crystal composition of claim 1, wherein the liquid crystal composition comprises, by total mass of the liquid crystal composition:

the first compound with a mass percentage ranging from 1% to 35%;

the second compound with a mass percentage ranging from 1% to 40%;

the third compound with a mass percentage ranging from 1% to 20%; and the fourth compound with a mass percentage ranging from 1% to 30%.

20. The liquid crystal composition of claim 19, wherein the liquid crystal composition comprises:

the first compound with the mass percentage ranging from 5% to 22%;

the second compound with the mass percentage ranging from 10% to 30%;

the third compound with the mass percentage ranging from 1% to 15%; and the fourth compound with the mass percentage ranging from 5% to 25%.

* * * * *